United States Patent
Zaev et al.

(10) Patent No.: US 12,309,247 B2
(45) Date of Patent: May 20, 2025

(54) SEMANTIC COMMUNICATION AND PROGRAMMABLE PROTOCOL STACK: MEDIA ACCESS CONTROL

(71) Applicant: Apple Inc., Cupertino, CA (US)

(72) Inventors: Danila Zaev, Munich (DE); Ayman Naguib, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 511 days.

(21) Appl. No.: 17/876,247

(22) Filed: Jul. 28, 2022

(65) Prior Publication Data

US 2023/0413267 A1    Dec. 21, 2023

Related U.S. Application Data

(60) Provisional application No. 63/353,410, filed on Jun. 17, 2022.

(51) Int. Cl.

| | |
|---|---|
| *H04L 69/16* | (2022.01) |
| *H04L 1/00* | (2006.01) |
| *H04L 1/1812* | (2023.01) |
| *H04L 69/22* | (2022.01) |
| *H04W 72/20* | (2023.01) |
| *H04W 72/23* | (2023.01) |
| *G06F 40/30* | (2020.01) |
| *H04W 80/02* | (2009.01) |

(52) U.S. Cl.
CPC .......... *H04L 69/161* (2013.01); *H04L 1/0057* (2013.01); *H04L 1/1812* (2013.01); *H04L 69/22* (2013.01); *H04W 72/20* (2023.01); *H04W 72/23* (2023.01); *G06F 40/30* (2020.01); *H04W 80/02* (2013.01)

(58) Field of Classification Search
CPC ... H04L 69/161; H04L 1/0057; H04L 1/1812; H04L 69/22; H04W 72/20; H04W 72/23; H04W 80/02; G06F 40/30
See application file for complete search history.

(56) References Cited

U.S. PATENT DOCUMENTS

| | | | |
|---|---|---|---|
| 12,028,436 B2 * | 7/2024 | Zaev | ................ G06N 3/044 |
| 2021/0056215 A1 | 2/2021 | Guha | |
| 2021/0073630 A1 | 3/2021 | Zhang | |
| 2023/0186155 A1 | 6/2023 | Kasagi | |
| 2023/0198663 A1 | 6/2023 | Stoica | |

* cited by examiner

*Primary Examiner* — Duc C Ho
(74) *Attorney, Agent, or Firm* — Kowert, Hood, Munyon, Rankin & Goetzel, P.C.

(57) ABSTRACT

This disclosure relates to techniques for performing communication in a wireless communication system. The communication may be semantic communication and/or may use a programmable protocol stack. A protocol stack at a transmitter and/or receiver may include customization from an application platform, e.g., which may replace one or more layers relative to a non-customized protocol stack. A transmitter may transmit data, via the customized protocol stack, using a best effort data channel, e.g., with transmission characteristics that are relatively lossy in comparison to a data channel used by the non-customized protocol stack. A receiver may receive the data and may determine whether reception is successful, e.g., from a semantic point of view. A media access control layer may interact with both the customized and non-customized stacks. The proposed system may support higher data rates, less retransmissions, and/or better quality of user experience.

20 Claims, 17 Drawing Sheets

SEMANTIC COMMUNICATION AND PROGRAMMABLE PROTOCOL STACK: MEDIA ACCESS CONTROL

PRIORITY INFORMATION

This application claims priority to U.S. provisional patent application Ser. No. 63/353,410, entitled "Semantic Communication and Programmable Protocol Stack," filed Jun. 17, 2022, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless communications, and more particularly to systems, apparatuses, and methods for performing semantic communication in a wireless communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever-increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus, it is very important to also reduce power requirements in UE device designs while allowing the UE device to maintain good transmit and receive abilities for improved communications. Further, the increasing number, diversity, and sophistication of applications may have different communication requirements. Privacy and performance are also objectives. Accordingly, improvements in the field are desired.

SUMMARY

Embodiments are presented herein of apparatuses, systems, and methods for performing communication for various types of applications using a flexible protocol stack and maintaining privacy in a wireless communication system.

In some embodiments, a method may comprise at a media access control (MAC) layer of a wireless device: receiving, from a physical layer of the wireless device, a first downlink control information (DCI) on a physical downlink control channel (PDCCH); determine, based on the first DCI, a location of first semantic control information (SCI); receive, from the physical layer of the wireless device, the first SCI; provide, to an application platform delegate operating on the wireless device, the first SCI; receive, from the physical layer of the wireless device, first data associated with the first SCI; provide, to the application platform delegate operating on the wireless device, the first data; receive, from the application platform delegate operating on the wireless device, an indication of whether the first data is decoded successfully; and provide, to the physical layer of the wireless device, a hybrid automatic repeat request based the indication of whether the first data is decoded successfully.

In some embodiments, a method may comprise at a media access control (MAC) layer of a base station of a cellular network: establishing communication with a first user equipment (UE); receiving, from a higher layer of a first protocol stack operating according to a 3GPP wireless standard, first data for the first UE; receiving, from a layer of a second protocol stack, different from the first protocol stack, associated with a first application platform, an indication that the second protocol stack has second data for the first UE; exchanging one or more coordination message with the layer of the second protocol stack to determine a standardized resource sharing for transmission of the first data and the second data to the UE; and providing, to a physical layer of the base station, the first data for transmission to the according to the standardized resource sharing.

In some embodiments, at a media access control (MAC) layer of a base station of a cellular network, a method may include establishing communication with a first user equipment (UE) and receiving, from a higher layer of a first protocol stack operating according to a 3GPP wireless standard, first data for the first UE. The method may include receiving, from a higher layer of a second protocol stack, different from the first protocol stack, associated with a first application platform, second data for the first UE. The method may include scheduling, for transmission to the UE via a physical layer of the base station, the first data on a first channel, wherein the first channel is a physical downlink shared channel (PDSCH) associated with a first level of losses and scheduling, for transmission to the UE via the physical layer of the base station, the second data on a second channel, wherein the second channel is associated with a second level of losses higher than the first level of losses; scheduling, for transmission to the UE via the physical layer of the base station, first downlink control information (DCI) indicating the scheduling of the first data on the first channel; and scheduling, for transmission to the UE via the physical layer of the base station, second DCI. The second DCI may indicate the scheduling of the second data on the second channel and an identifier of the first application platform.

Note that the techniques described herein may be implemented in and/or used with a number of different types of devices, including but not limited to base stations, access points, cellular phones, portable media players, tablet computers, wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
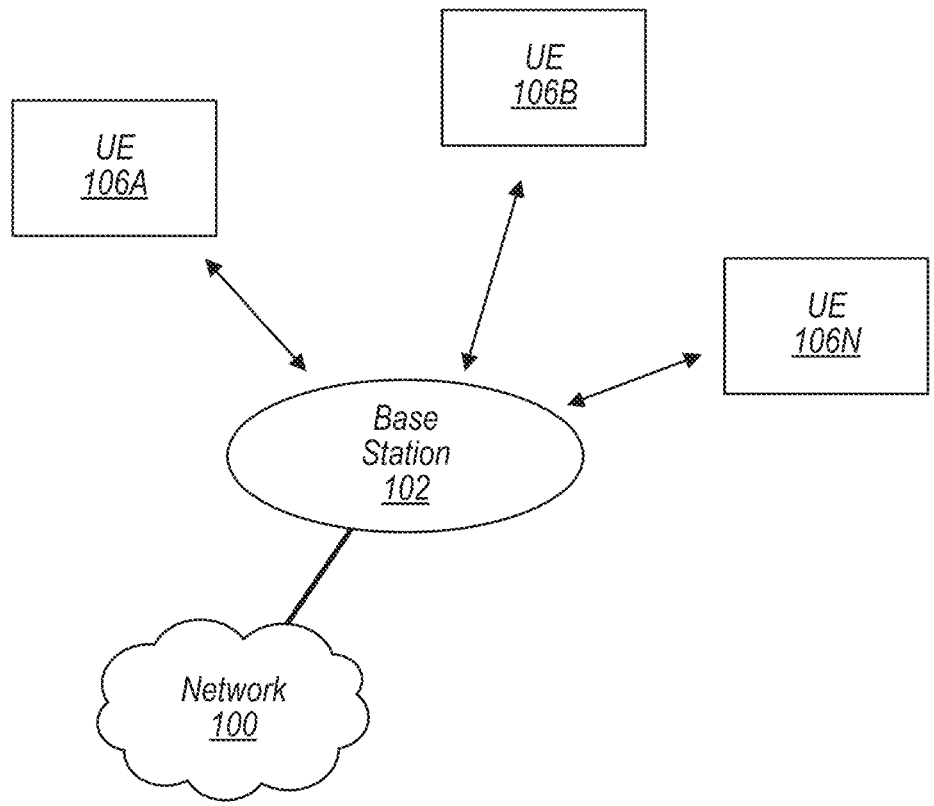
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UE: User Equipment
RF: Radio Frequency
BS: Base Station
GSM: Global System for Mobile Communication
UMTS: Universal Mobile Telecommunication System
LTE: Long Term Evolution
NR: New Radio
TX: Transmission/Transmit
RX: Reception/Receive
RAT: Radio Access Technology
TRP: Transmission-Reception-Point
DCI: Downlink Control Information
CSI: Channel State Information
CSI-RS: Channel State Information Reference Signals
CQI: Channel Quality Indicator
PMI: Precoding Matrix Indicator
RI: Rank Indicator

Terms

The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
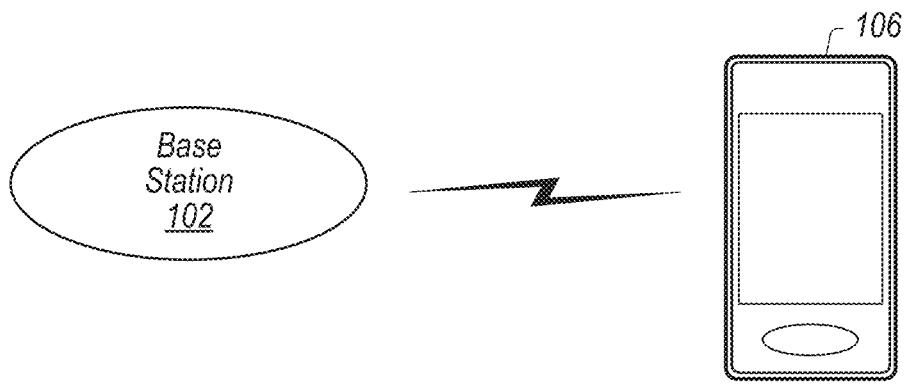
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform techniques for performing semantic communication in a wireless communication system, such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, an unmanned aerial vehicle (UAV), an unmanned aerial controller (UAC), an automobile, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for multiple-input, multiple-output or "MIMO") for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include any number of antennas and may be configured to use the antennas to transmit and/or receive directional wireless signals (e.g., beams). Similarly, the BS 102 may also include any number of antennas and may be configured to use the antennas to transmit and/or receive directional wireless signals (e.g., beams). To receive and/or transmit such directional signals, the antennas of the UE 106 and/or BS 102 may be configured to apply different "weight" to different antennas. The process of applying these different weights may be referred to as "precoding".

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
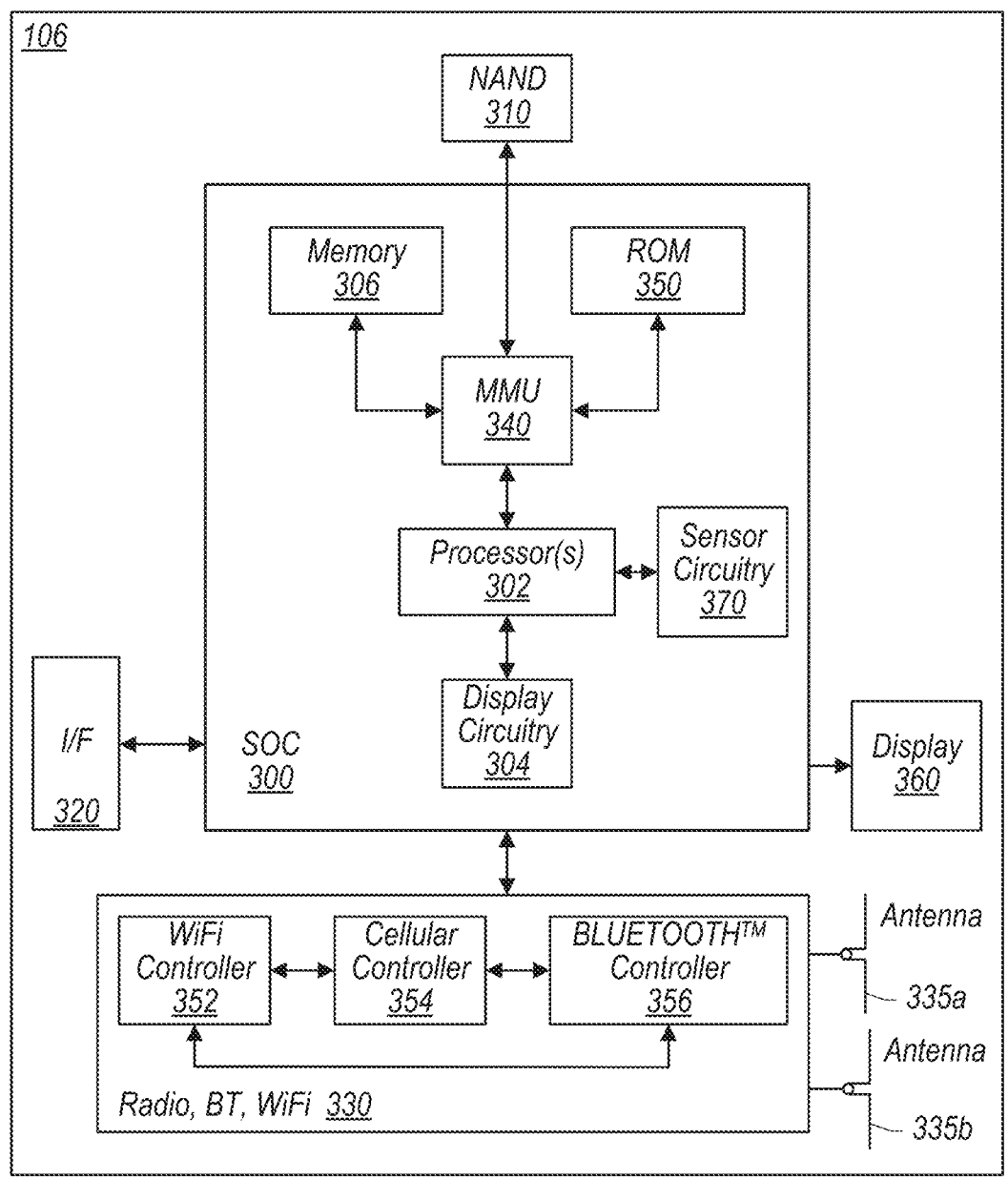
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include sensor circuitry 370, which may include components for sensing or measuring any of a variety of possible characteristics or parameters of the UE 106. For example, the sensor circuitry 370 may include motion sensing circuitry configured to detect motion of the UE 106, for example using a gyroscope, accelerometer, and/or any of various other motion sensing components. As another possibility, the sensor circuitry 370 may include one or more temperature sensing components, for example for measuring the temperature of each of one or more antenna panels and/or other components of the UE 106. Any of various other possible types of sensor circuitry may also or alternatively be included in UE 106, as desired. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include or couple to at least one antenna (e.g., 335a), and possibly multiple antennas (e.g., illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. The communication circuitry may include multiple receive chains and/or multiple transmit chains for receiving and/or transmitting multiple spatial streams, such as in a multiple-input multiple output (MIMO) configuration. As noted above, the UE may be configured to communicate wirelessly using multiple wireless communication standards in some embodiments.

The UE 106 may include hardware and software components for implementing methods for the UE 106 to perform techniques for performing semantic communication in a wireless communication system, such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform techniques for performing semantic communication in a wireless communication system according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g., LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
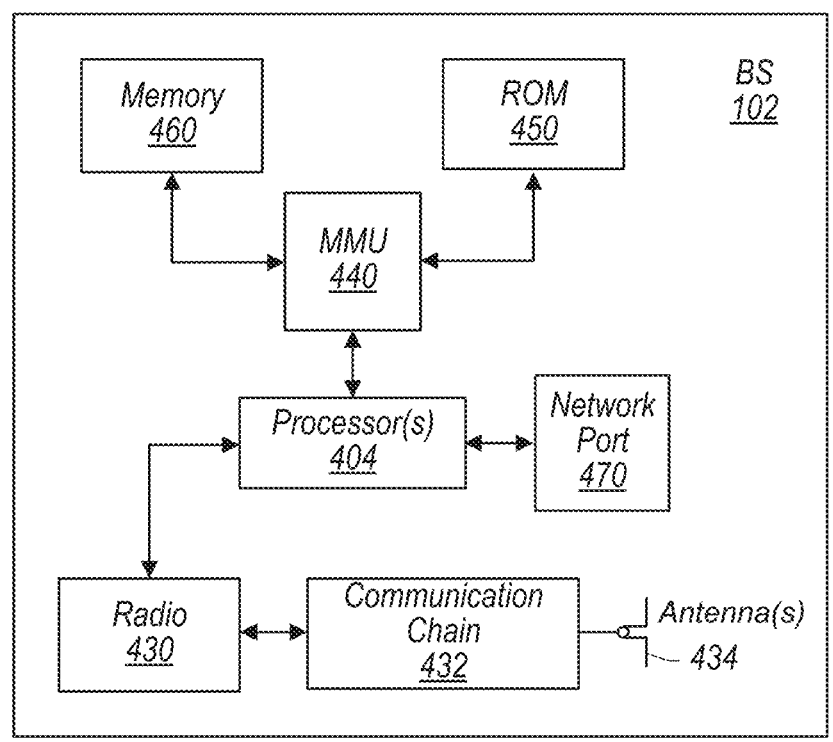
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transmission and reception points (TRPs). In addition, a UE capable of operating according to 5G NR may be connected to one or more TRPs within one or more gNBs.

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, 5G NR, 5G NR SAT, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, 5G NR SAT and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g., it may include at least one Ethernet port, and radio 430 may be designed to communicate according to the Wi-Fi standard.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
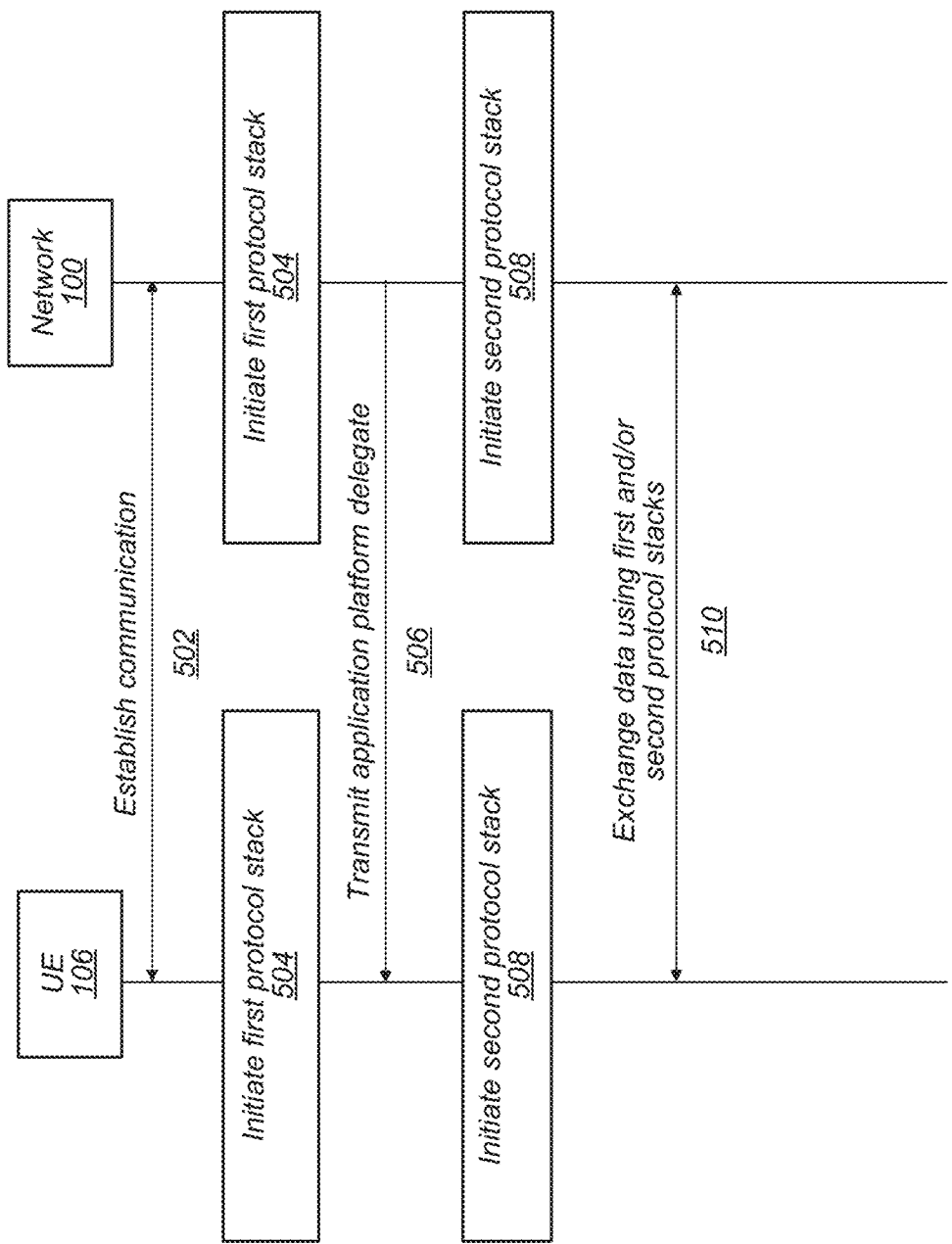
FIG. 5 is a flowchart diagram illustrating aspects of an exemplary possible method for performing semantic communication in a wireless communication system, according to some embodiments.

FIG. 5—Programmable Protocol Stack Operation

According to some cellular communication technologies, it may be possible for a wireless device to communicate with one or more edge servers. Such an edge server may be associated with one or more applications. Thus, an application executing on a wireless device may exchange data and/or control information with one or more edge servers associated with the application. An application provider may develop the application(s) in a way that the application(s) rely on communication with the server(s) for some functions. The data exchange for supporting such functions may have different characteristics for different applications. For example, different data types may be exchanged and may have different quality of service (QoS) characteristics, different traffic patterns, different data volumes, etc.

Thus, it may be beneficial to specify techniques for supporting improved flexibility and efficiency of communication between a wireless device and relevant edge servers. To illustrate one such set of possible techniques, FIG. 5 is a flowchart diagram illustrating a method for performing programmable protocol stack operation, e.g., to support semantic communication, in a wireless communication system, at least according to some embodiments.

Aspects of the method of FIG. 5 may be implemented by a wireless device, e.g., in conjunction with a cellular network including one or more cellular base stations, such as a UE 106, network 100, and BS 102 illustrated in and described with respect to various of the Figures herein, or more generally in conjunction with any of the computer circuitry, systems, devices, elements, or components shown in the above Figures, among others, as desired. For example, a processor (and/or other hardware) of such a device/network may be configured to cause the device/network to perform any combination of the illustrated method elements and/or other method elements.

Note that while at least some elements of the method of FIG. 5 are described in a manner relating to the use of communication techniques and/or features associated with 3GPP and/or NR specification documents, such description is not intended to be limiting to the disclosure, and aspects of the method of FIG. 5 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

The wireless device may establish communication with a cellular network, e.g., via a wireless link(s) with one or more base station (502), according to some embodiments. The communication may include a cellular link according to a wireless standard such as 5G NR and/or 6G. For example, the wireless device may establish a session with an AMF entity of the cellular network by way of one or more base stations that provide radio access to the cellular network. Other types of cellular links are also possible, and the cellular network may also or alternatively operate according to another cellular communication technology (e.g., LTE, UMTS, CDMA2000, GSM, etc.), according to various embodiments.

Establishing the wireless link may include establishing a RRC connection with a serving cellular base station, at least according to some embodiments. Establishing the first RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state. In some instances, the RRC connection may also be released (e.g., after a certain period of inactivity with respect to data communication), in which case the wireless device may operate in a RRC idle state or a RRC inactive state. In some instances, the wireless device may perform handover (e.g., while in RRC connected mode) or cell re-selection (e.g., while in RRC idle or RRC inactive mode) to a new serving cell, e.g., due to wireless device mobility, changing wireless medium conditions, and/or for any of various other possible reasons.

At least in some instances, establishing the wireless link(s) may include the wireless device providing capability information for the wireless device. Such capability information may include information relating to any of a variety of types of wireless device capabilities.

The wireless device and the network/base station may initiate corresponding first protocol stacks (504), according to some embodiments. The first protocol stack on the wireless device may correspond to a first protocol stack executing on the network/base station. The first protocol stack may be a legacy or general protocol stack for general use for communication between the wireless device and the network (e.g., including communication via the network to any other devices, such as another wireless device and/or various edge servers). For example, the first protocol stack may include various layers and may operate according to a wireless standard such as 5G NR and/or 6G. For example, the first protocol stack may include layers such as: application, transport, service data adaptation protocol (SDAP), packet data convergence protocol (PDCP), radio link control (RLC), media access control (MAC), and physical (PHY) layers.

Figure 9:
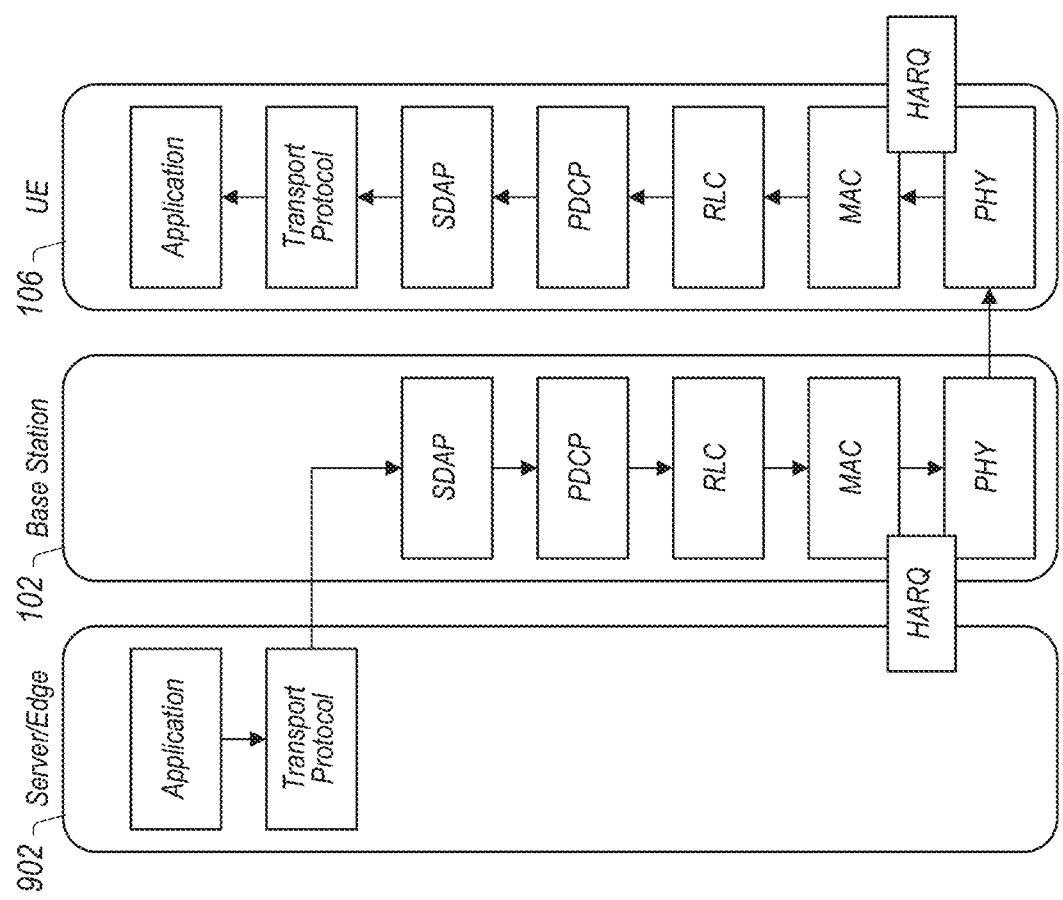

As shown in FIG. 9, all of these layers of the first protocol stack may performed at the wireless device/UE. On the network side, the upper layers (e.g., application and transport layers) may be performed at an edge server or other device while the lower and middle layers (e.g., SDAP through PHY) may be performed at a base station. The lower layers (e.g., MAC and PHY) may perform hybrid automatic retransmission request (HARD) functions.

The network may receive an application platform delegate (APD) from an application platform provider and may provide the APD to the wireless device (506), according to some embodiments. The APD may be or include a software defined protocol stack, e.g., defined by an application platform (e.g., a company providing one or more applications that may execute on the wireless device, such as Apple, Google, Meta, etc.). In some embodiments, the application platform provider may provide different versions of the APD for the network/BS and the wireless device. Thus, the network may provide the wireless device version of the APD to the wireless device.

The APD at the network/BS may be a "black box" to implement some protocol functions, e.g., it may not expose its internal operations to the network. Interfaces between APD and the network-defined part of the protocol stack may be standardized. However, APD internal procedures may not be standardized, and instead may be left to application platform provider to design. The BS/network may not have access to the APD code. The APD may not have access to PHY layer data. Thus, the BS may know an APD association of the data flow (e.g., the BS may be able to determine which of potentially multiple APDs an uplink transport block is associated with), but may not know the particular application or semantics of the data.

The reception of the APD by the network and transmission to the wireless device may be performed at any time. As one possibility, the APD may be received by the network and/or wireless device in advance of the communication stage (e.g., prior to 502). For example, the APD may be a part of a wireless device operating system, and thus may be installed on the wireless device prior to communication with the network. Thus, the network may not provide the APD to the wireless device. As another possibility, the APD may be provided to the wireless device and/or network in semi-static manner. For example, an application platform provider may update the APD as needed and/or periodically, e.g., with an update period magnitude that is larger than a typical communication session duration. The network may receive such updates from the application platform provider at any time, and may implement the updates on the network and/or provide them to the wireless device accordingly.

The network and the wireless device may initiate a second protocol stack (508), according to some embodiments. The second protocol stack on the wireless device may correspond to a second protocol stack executing on the network/ base station. The second protocol stack may be performed by or incorporate the APD. The second protocol stack may be used for some or all communications of one or more applications provided by the application platform provider.

In some embodiments, the second protocol stack may support cross-layer semantic communication between the wireless device and an edge server, e.g., associated with an application executing on the wireless device provided by the application platform provider. According to semantic communication, an application may generate semantic blocks of information to transmit (e.g., video frame, image, virtual reality (VR) frame, and/or sensing data, etc.). The application (e.g., and/or APD) may define a set of semantic block types.

Figure 10:
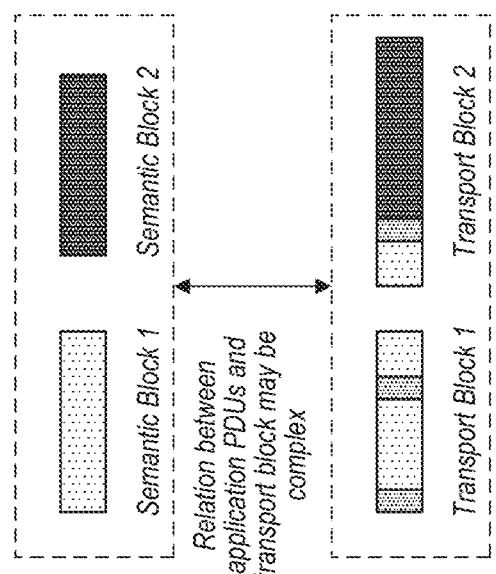

Semantics may be known at the application layer. However, to promote efficient and flexible semantic communication, various changes may be made at lower layers, e.g., at low-MAC layer. Semantic blocks may be considered as application protocol data units (PDUs). As shown in FIG. 10, the relation between application PDUs/semantic blocks and transport blocks may be complex. A layer 2 (L2, e.g., PDCP, RLC, and MAC) redesign may promote semantically meaningful transport blocks. HARQ may operates based on transport blocks. Thus, a semantic transport block may be evaluated semantically for retransmission request purposes (e.g., based on HARQ and/or updated retransmission protocols). For example, semantic data type information may be passed through the protocol stack to the low-MAC layer for use in retransmission request operations.

In some embodiments, a generative adversarial network (GAN) model or similar model may be trained individually for each semantic block type to obtain one or more models, such as an encoder model, restorer model, and/or discriminator model. These models may be shared between network/ BS and UE. Restorer and discriminator models may be applied at the receiver end. The encoder model may be applied at the transmitter end.

In some embodiments, semantic blocks may be transmitted with high modulation schemes and low-redundancy channel coding. Receiver may use best-effort (BE) forward error correction, then (e.g., if a level of corruption exceeds a configurable threshold) apply a restorer model to try to recover data of a corrupted semantic block.

Figure 8:
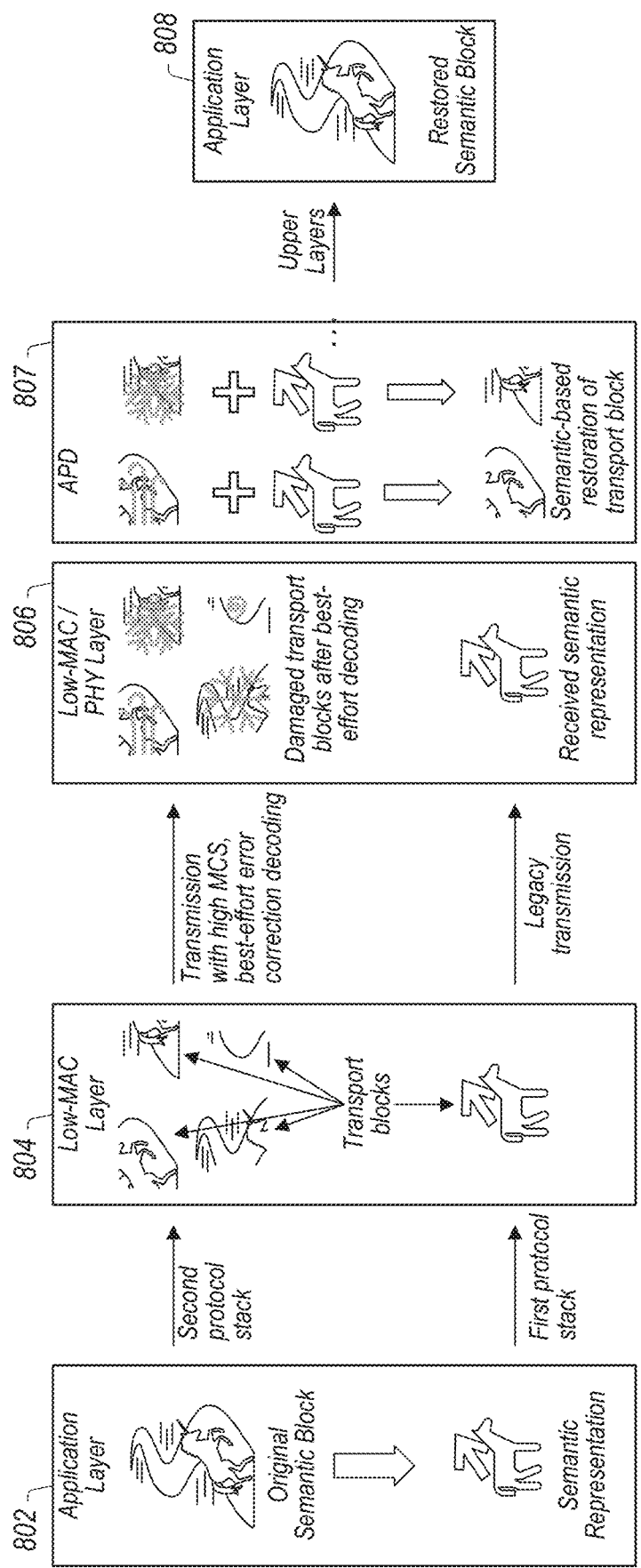

In some embodiments, the restorer model may incorporate a small sized semantic representation of the data of the semantic block, e.g., as shown in FIG. 8, according to some embodiments. The small-sized semantic representation for a semantic block may be provided to receiver via the first protocol stack. The small sized semantic representation may be designed to help the restoring of the corrupted block. The transmitter may generate the semantic representation using a model (e.g., at the APD). Such a model may be trained with the restorer model (and/or possibly other models), e.g., by a GAN of the application platform provider.

In some embodiments, after the attempted restoration, the receiver may use a discriminator model to determine if the block is recovered successfully (e.g., from semantic point of view, e.g., based on known semantic information and context as well as the semantic block type). This way the HARQ process may be relaxed and may allow for a more efficient and/or flexible use of resources relative to the first protocol stack.

Figure 11:
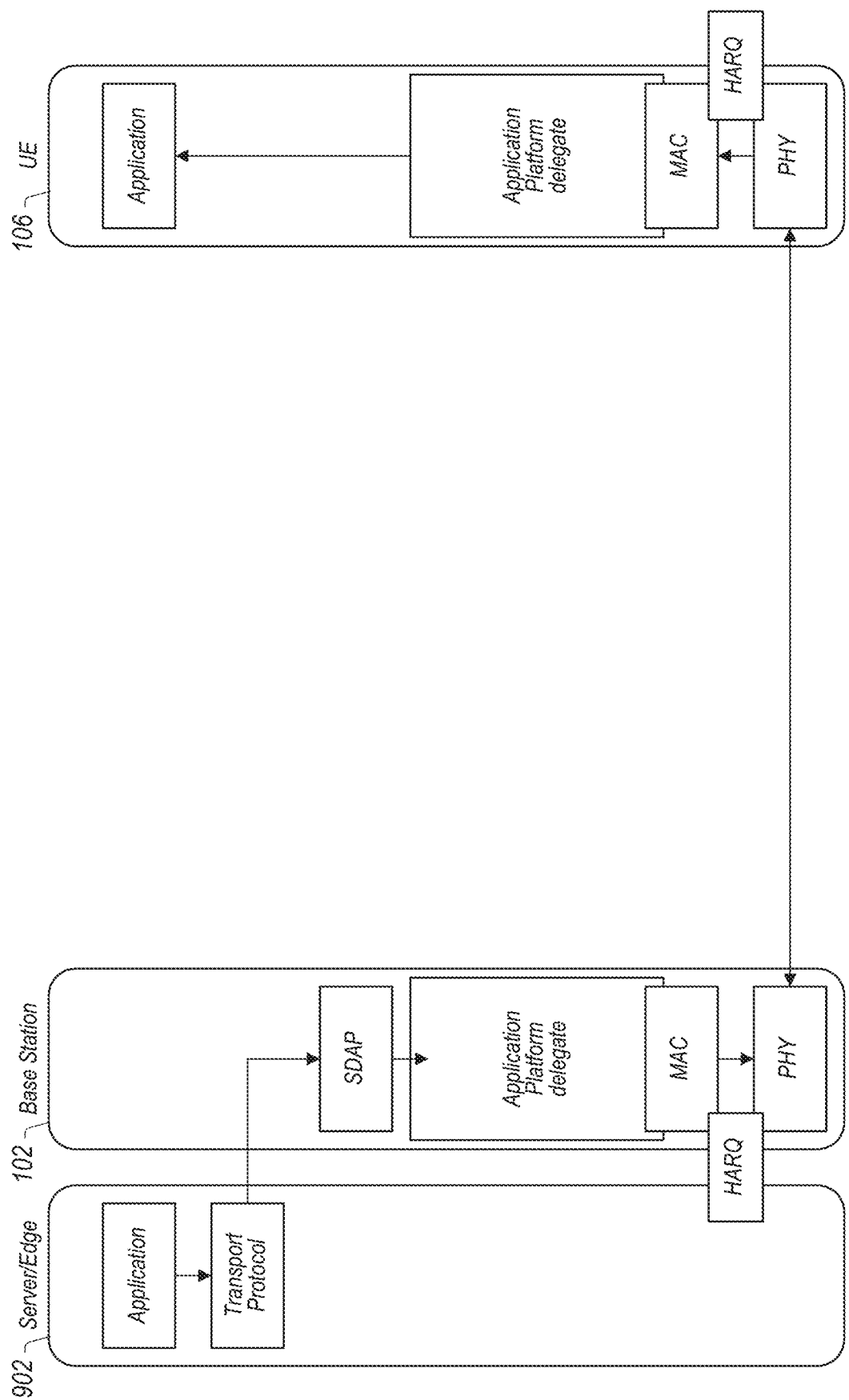

In the second protocol stack, the APD may provide some or all of the functions of some layers (e.g., in comparison to the first protocol stack. For example, as shown in FIG. 11, the APD may replace the layers between the SDAP and MAC layers. In some embodiments, the APD may also replace the functions of the MAC layer. For example, MAC may be mostly standardized, but some of MAC modules may be also defined by Application Provider (e.g., in the APD). SDAP at a transmitter may direct packet flow into the appropriate protocol stack (e.g., either the first stack, second stack, or potentially both the first and second stack).

In the second protocol stack, the MAC at the receiver may identify both the protocol stack and the semantics, and may apply corresponding procedures. For example, based on information about a received semantic block (e.g., application provider, semantic block type, etc.) the MAC layer may route the semantic block to an appropriate protocol stack. As another example, a PHY layer at the receiver may determine whether to provide a transport block to either or both a MAC layer of the first protocol stack and the APD (e.g., including a MAC-like function of the second protocol stack) based on downlink control information (DCI). For instance, if a DCI scheduling the transport block indicates that the block is a semantic block (e.g., and/or otherwise indicates that the block should be provided to the APD), the PHY layer may provide the block to the APD.

In some embodiments, the application platform provider (e.g., the APD at either or both the transmitter and the receiver) may know the semantics of the data and may interact with MAC in order to utilize this knowledge to promote efficient, timely, and/or flexible communication of semantic blocks between the wireless device and the edge server. This may allow ultra-lean application-driven protocol stack operation, e.g., processing without excess latency or use of resources in view of the knowledge of the application provider about the type, format, and/or context of data exchanged by the application.

One potential improvement in efficiency may relate to more flexibility/robustness with regard to decoding errors, and thus higher data rates (e.g., higher modulation and coding schemes (MCSs)) may be used and fewer retransmissions may be performed. For example, best effort (BE) error correction decoding may be used associated with a relatively more "lossy" MCS. A BE error correction decoder (e.g., together with a corresponding BE encoder) may attempt to successfully decode as many bits as possible (e.g., may attempt to achieve a low Bit Error Rate while also balancing other factors such as maintaining a high MCS, high throughput, low decoding complexity, low power consumption, etc.). Thus, the BE encoder/decoder may not select an MCS sufficient to fully decode some or all transport blocks (e.g., the BE encoder/decoder may not directly target minimizing Block Error Rate). Further, semantic communication may provide changes for HARQ module, e.g., at a low-MAC layer. However, semantic blocks and block types may be defined and generated at application layer, thus additional data may be provided from application layer to low-MAC layer through the whole protocol stack. Thus, the APD and/or second protocol stack may incorporate a cross-layer design.

In some embodiments, some or all interfaces of the APD may be standardized. For example, interfaces between the APD and the SDAP, RLC, MAC, and/or PHY (or other layers) of the first protocol stack may operate according to a wireless standard (e.g., as may be defined in the future by 3GPP, etc.).

The BS/network and the wireless device may support the first protocol stack, defined by the network (e.g., in view of a 3GPP and/or other standard), and the second protocol stack(s) defined by the APD(s). An SDAP layer may have a functionality to split PDU flow into a first protocol stack communication flow (e.g., with QoS sub-flows) and application driven (e.g., semantic, e.g., second protocol stack) flows (e.g., with APD sub-flows potentially created by the APD). Thus, downlink packets on the network side may be separated between first and second protocol stack below SDAP.

PDCP service data units (SDUs) (e.g., that are input to the APD for transmission by the second protocol stack) may have an encrypted header that may be read by APD in order to identify various characteristics. For example, the header may include fields such as application ID, the semantic block ID, the semantic block type ID, and the place of SDU data in the semantic block. An APD layer or function similar to PDCP may be able to forward PDCP PDU to both protocol stacks, e.g., at an RLC layer. This may allow for a correction if the packet is supposed to be sent by the first protocol stack.

An APD module similar to RLC may ensure that the semantic block is segmented in a semantically meaningful way, e.g., a segmenter model may perform the segmentation in a way that is compatible with the corresponding restorer and discriminator models.

The wireless device and the network may exchange uplink and/or downlink data and/or control information using the first and/or second protocol stacks (512), according to some embodiments. Some or all data of an application may be exchanged via the second protocol stack. However, it will be appreciated that an application for which some data is exchanged via the second protocol stack may also use the first protocol stack, in some cases. For example, the first protocol stack may be used to transmit semantic information such as a reduced size (e.g., reduced detail) representation of data transmitted via the second protocol stack. Similarly, the first protocol stack may be used to transmit control information about data transmitted via the second protocol stack. However, further control information may be exchanged via the second protocol stack. Such semantic information may be used by the receiver to interpret, restore, and/or determine whether the information received via the second protocol stack is received successfully.

It will be appreciated that data and/or control information transmitted via the first protocol stack may be transmitted using relatively lossless transmission. This data may include any data/control information not directly associated with the application(s) using the APD, as well as potentially some data/control information of such application(s). The lossless transmission may use a relatively low MCS. In contrast, the data and/or control information transmitted via the second protocol stack may be transmitted using relatively lossy transmission. This may include semantic data/control information that is directly associated with the application(s) using the APD. The lossy transmission may use a relatively high MCS. For example, given a particular channel condition (and possibly other factors), the first protocol stack may use a first MCS while the second protocol stack may use a second MCS, where the second MCS may be higher than the first MCS.

Thus, at least according to some embodiments, the method of FIG. 5 may be used to provide a framework according to which a wireless device and network can be configured to perform communication using flexible protocol stacks informed by semantic information, and thus to assist a cellular network to effectively and efficiently schedule and perform wireless communications with the wireless device, at least in some instances.

Although aspects of FIG. 5 may be described in terms of two protocol stacks, it will be appreciated that additional protocol stacks may be used as desired. For example, any number of application platform providers may provide APDs. A wireless device and network may operate protocol stacks associated with any number of APDs.

FIGS. 6-20 illustrate further aspects that might be used in conjunction with the method of FIG. 5 if desired. It should be noted, however, that the exemplary details illustrated in and described with respect to FIGS. 6-20 are not intended to be limiting to the disclosure as a whole: numerous variations and alternatives to the details provided herein below are possible and should be considered within the scope of the disclosure.

Figure 6:
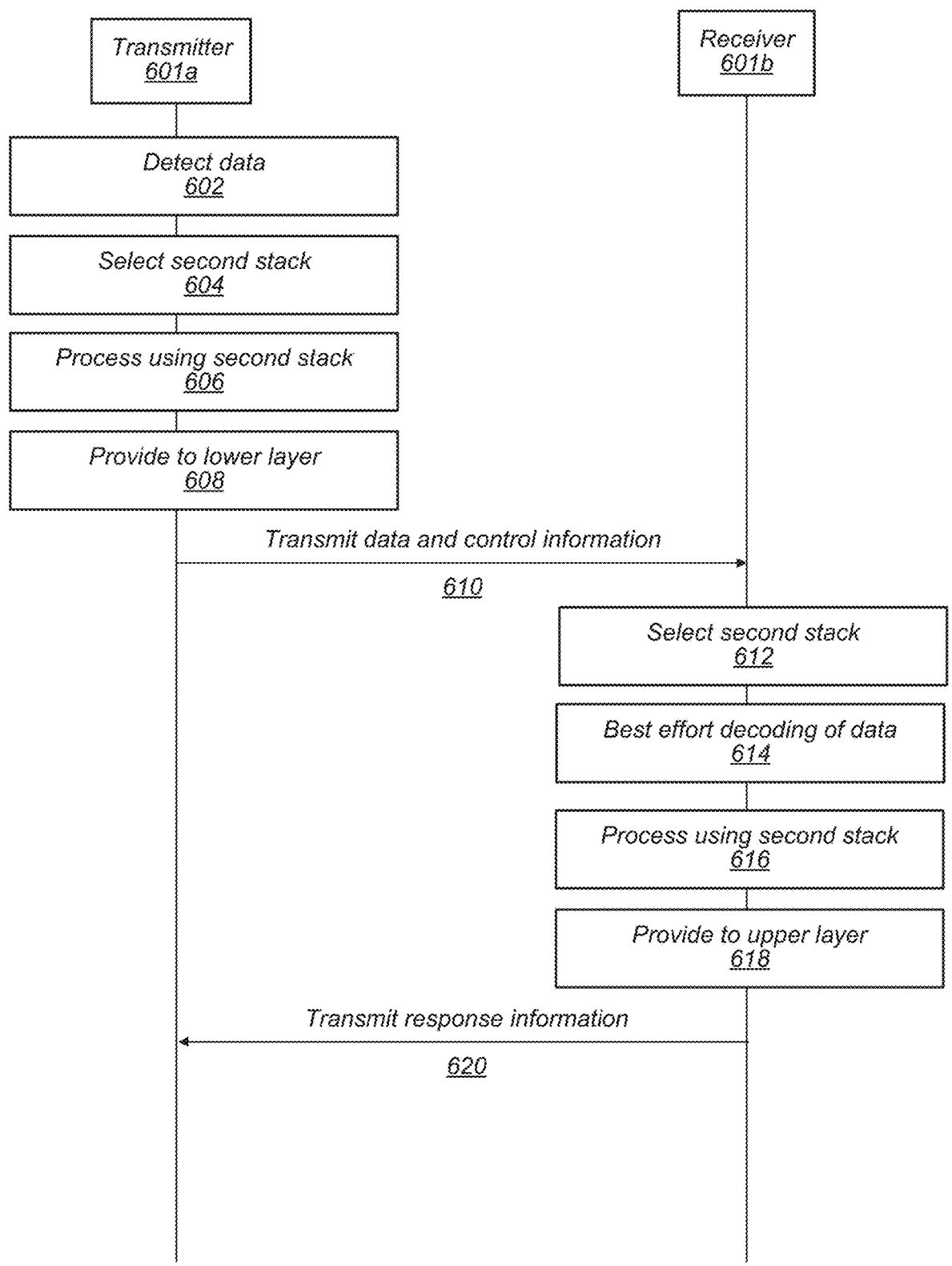
FIGS. 6-20 illustrate exemplary aspects of various possible approaches to semantic communication, according to some embodiments.

FIG. 6—Transmission and Reception Using a Flexible Protocol Stack

To illustrate one set of possible techniques for a data exchange (e.g., as in 512), FIG. 6 is a communication flow diagram illustrating a method for performing transmission and reception using programmable protocol stack operation, e.g., to support semantic communication, in a wireless communication system, at least according to some embodiments.

Aspects of the method of FIG. 6 may be implemented by a wireless device, e.g., in conjunction with a cellular network including one or more cellular base stations, such as a UE 106, network 100, and BS 102 illustrated in and described with respect to various of the Figures herein, or more generally in conjunction with any of the computer circuitry, systems, devices, elements, or components shown in the above Figures, among others, as desired. For example, a processor (and/or other hardware) of such a device/network may be configured to cause the device/network to perform any combination of the illustrated method elements and/or other method elements. Either the wireless device or the network/BS may be the transmitter 601a; the other may be the receiver 601b.

Note that while at least some elements of the method of FIG. 6 are described in a manner relating to the use of communication techniques and/or features associated with 3GPP and/or NR specification documents, such description is not intended to be limiting to the disclosure, and aspects of the method of FIG. 6 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 6 may operate as follows.

The transmitter may detect data to transmit to the receiver (602), according to some embodiments.

In the case that the transmitter is the wireless device, the data may be generated by an application layer.

In the case that the transmitter is the network/base station, the data may be received from a server, a different wireless device, etc. For example, the data may be received from an edge server (e.g., associated with an application provider of an APD), or any internet server, among various possibilities.

The transmitter may determine which of the first or second protocol to use to transmit the data to the receiver (604), according to some embodiments. The selection may be based on information provided with the data (e.g., by the application layer, application provider, etc.). For example, the information may include an indication of what stack should be used to transmit the data, e.g., an APD ID. Note that an APD ID (e.g., a default ID) may be associated with the first protocol stack. Alternatively, the selection may be based on an IP mask of the data. For example, a UPF (User Plane Function) of Core Network may be-configured to use a specific IP mask to identify a specific APD ID (and thus the protocol stack). Similarly, the wireless device may use IP masks to select the protocol stack/APD.

In the case that the transmitter is the network/base station, an application at the server side may mark packets or in some other way inform the core network that the flow is associated with a particular APD. Alternatively, such marking could be done by the core network, e.g., using application detection functionality. The network/BS may use such markings to select the protocol stack.

In some embodiments, selection of the protocol stack may occur at a SDAP layer. The selection may be based on a service data unit (SDU) packet header. In some embodiments, the selection may be based on a configuration of a protocol data unit (PDU) session associated with (e.g., including) the first block of information. For example, a PDU session may be configured for a particular protocol stack. Thus, packets of such a PDU session may be directed to the corresponding protocol stack. In some embodiments, the SDAP layer may add an SDAP header indicating the selected protocol stack and/or indicating other information about handling of the data.

Note that, in the example of FIG. 6, the second protocol stack is selected. However, it will be appreciated that during operation of the methods of FIGS. 5 and 6, the transmitter may select the first protocol stack for some data and the transmitter may select the second protocol stack for other data.

The selection may be performed by the SDAP layer of the transmitter, which may pass the data to the selected (e.g., second) protocol stack. For example, the SDAP layer may divide a flow of PDUs between the protocol stacks, passing the data of a semantic flow corresponding to the APD of the second protocol stack to that APD. Other PDUs (e.g., associated with an APD ID of the first protocol stack or associated with APD IDs of a different APD) may be passed to other stacks.

Figure 13:
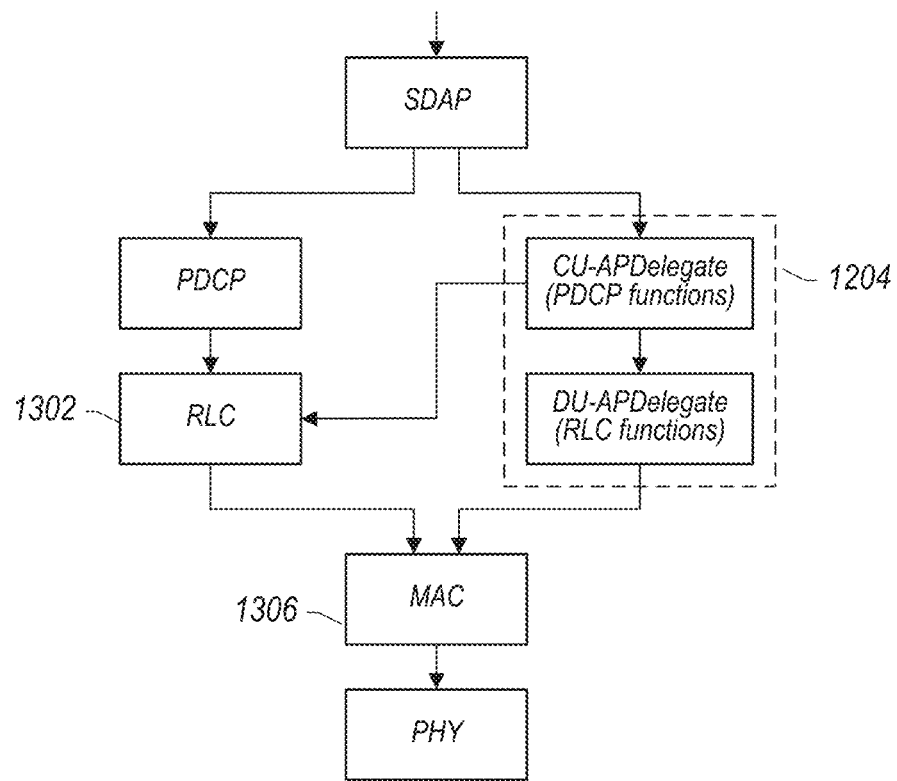
Figure 14:
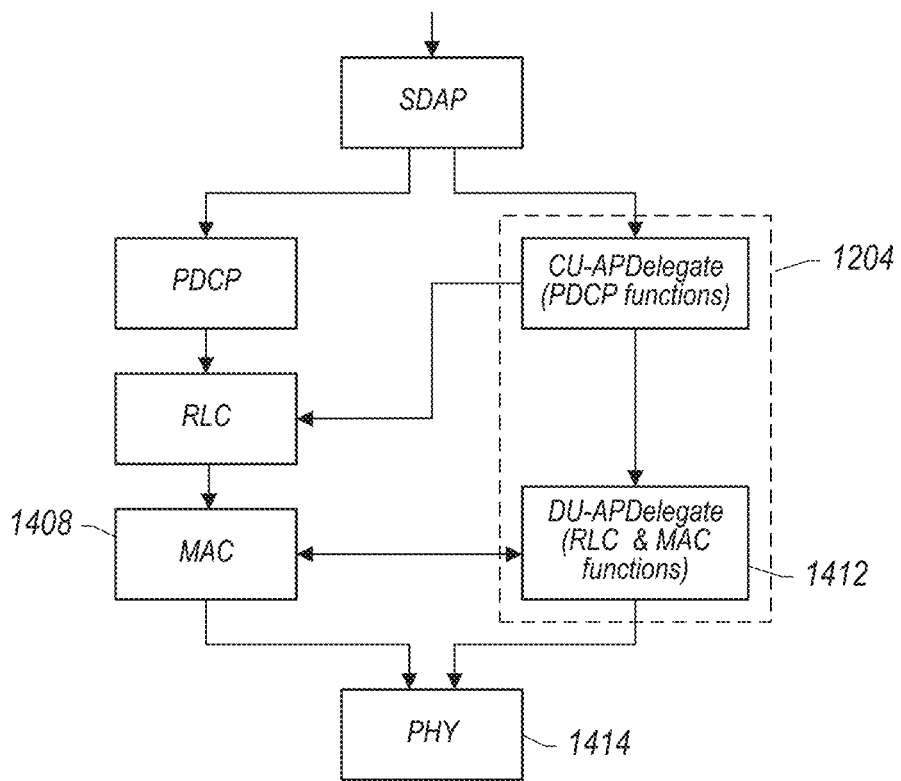

The transmitter may process the data using the selected (e.g., second) protocol stack (606), according to some embodiments. FIGS. 13 and 14, discussed further below, provide examples of how the second protocol stack may be structured. It will be appreciated that the details of the APD operation may be determined by individual application platform providers, e.g., different APDs may operate differently.

The second protocol stack may provide the data to a lower layer of the transmitter for further transmission (608), according to some embodiments. The lower layer may be the MAC layer (e.g., in collaboration with the PHY layer, as in FIG. 13) or the PHY layer (e.g., as in FIG. 14), according to various embodiments. The lower layer may buffer the data, according to some embodiments.

In the case that the transmitter is the BS/network, the MAC layer (e.g., alone, in the example of FIG. 13 or in conjunction with the APD, in the example of FIG. 14) may have the information about the number of bits that are in an RLC buffer for any or all of:

Transmission from the first protocol stack such data and or control information not associated with semantic communication, e.g., to be transmitted according to legacy e.g., lossless transmission approaches;

Transmission from the second protocol stack, such as the content of one or more semantic block, e.g., to be transmitted according to best-effort (BE) (e.g., lossy) transmission. Note that (e.g., in the example of FIG. 13) the MAC layer may not know which semantic block it is and/or which application it belongs to; and/or Transmission associated with the second protocol stack, but to be transmitted according to the legacy/lossless transmission approaches. This may include semantic control information (SCI) and/or reduced size semantic representation of a semantic block. In some embodiments, the APD may indicate QoS characteristics for this data, such as a specific priority for scheduling, and/or specific recommendation for MCS selection.

During scheduling, the MAC layer (e.g., of the BS) may reserve resources (e.g., on physical downlink shared channel (PDSCH) and/or a best-effort (BE) (e.g., lossy) PDSCH (BE-PDSCH) for these transmissions. After scheduling, the MAC may provide the resource allocation result of data related to the APD to its APD-RLC. In addition to providing RLC PDU by request of MAC, APD-RLC may also generate SCI, which may be encrypted, and may contain the information about the scheduled semantic processes IDs, partitioning of semantic blocks into APD-RLC PDUs, location of the scheduled BE transmissions and the semantic representation. In case the new semantic block starts to be transmitted, it may also contain application ID and semantic block type ID.

The lower layers may also transmit DCI, e.g., scheduling PDSCH, BE-PDSCH, and/or other PDCCH transmissions.

DCI for semantic communication may include various fields, including: location of the SCI and APD ID.

In some embodiments, the PDSCH and BE-PDSCH may be separate channels. In some embodiments, transmissions on BE-PDSCH may be performed on PDSCH resources, e.g., using different MCS (e.g., and/or other transmission characteristics (e.g., transmit power) or QoS) than other PDSCH transmissions. The BE-PDSCH transmissions may be performed in a manner with higher loss probability than the PDSCH transmissions.

In some embodiments, various types of information may be mapped to downlink physical channels as summarized in the following table:

| | |
|---|---|
| 1. Downlink Control Information (DCI) | 1. PDCCH |
| 2. Semantic Control Information (SCI) | 2. PDSCH and/or PDCCH |
| 3. Semantic Representation | 3. PDSCH |
| 4. DL Data for lossless transmission | 4. PDSCH |
| 5. DL Data for best-effort transmission | 5. BE-PDSCH |

In the case that the transmitter is the wireless device, the MAC layer may transmit a scheduling request (SR) to the network for the data. The wireless device may use the SR to inform BS/network/receiver about the buffer and data type(s) of the buffer data. Thus, the SR may be formatted for semantic-based communication, e.g., by including one or more new fields. For example, fields of the SR may include: APD ID, semantic block type ID, and/or data volume, among various possibilities. Data volume calculation procedure at the wireless device may include calculating separate data volumes for BE transmissions (e.g., semantic data block(s) and/or SCI) and lossless transmissions (e.g., other information such as data not associated with the APD, small-sized semantic representation(s) of a semantic data block(s), control information, etc.). The SR may be transmitted in uplink control information (UCI) or MAC control element, among various possibilities. It will be appreciated that one or more types of data (e.g., with corresponding IDs and volumes) may be described in a single SR. Alternatively, multiple SRs may be used (e.g., one SR per semantic block type ID, etc.).

Similar to the downlink case, a physical uplink shared channel (PUSCH) may be used for transmission of the lossless transmissions and a BE-PUSCH may be used for the BE/lossy transmissions. These may be separate channels. Alternatively, BE-PUSCH transmissions may be performed on PUSCH using different MCS and/or other characteristics, e.g., associated with a higher loss probability.

In some embodiments, various types of information may be mapped to uplink physical channels as summarized in the following table:

| | |
|---|---|
| 1. Semantic Representation | 1. PUSCH |
| 2. UL Data for lossless transmission | 2. PUSCH |
| 3. UL Data for best-effort transmission | 3. BE-PUSCH |
| 4. UCI, Semantic NACK feedback | 4. PUCCH/PUSCH |
| 5. MAC control element | 5. PUSCH |

The transmitter may transmit the information to the receiver (610), according to some embodiments. The transmitter may transmit the information using the channel(s), MCS(s), and/or other characteristics as discussed above. The receiver may receive the information.

The receiver may select the protocol stack for processing the received information (612), according to some embodiments. For example, the receiver may make the selection based on DCI scheduling the transmission or in separate DCI. The DCI may include an indication of what stack should be used to process the data, e.g., an APD ID. Note that an APD ID (e.g., a default ID) may be associated with the first protocol stack. A MAC and/or PHY layer of the receiver may perform the selection of the protocol stack.

Note that, in the example of FIG. 6, the second protocol stack is selected. However, it will be appreciated that during operation of the methods of FIGS. 5 and 6, the receiver may select the first protocol stack for some data and the receiver may select the second protocol stack for other data. For instance, some control information (e.g., on a control channel) associated with a semantic data transmission (e.g., on a BE share channel) may be routed through the first protocol stack. However, the semantic data may be routed through the second protocol stack.

The receiver may perform best effort decoding of the data (614), according to some embodiments. The MAC and/or PHY layer of receiver may perform the decoding. As mentioned above, the HARQ process may be relaxed (e.g., for the second protocol stack in comparison to the first protocol stack). Potentially, different FEC encoding/decoding methods may be used in BE channel and lossless channel. Thus, the choice of decoding algorithm may depend on the type of the physical channel.

Based on the decoding, the MAC and/or PHY layer may determine a level of corruption of the decoded data. The level of corruption may be an estimated percentage of corrupted data, a determination of whether the level of corruption exceeds a threshold, or a determination of one of a plurality of corruption level ranges (e.g., high, medium, low, etc., e.g., based on a corresponding set of thresholds). The MAC and/or PHY layer may indicate the level of corruption of the decoded data to the APD. Further, the MAC and/or PHY layer may provide the decoded data to the APD.

The receiver may process the decoded data using the selected (e.g., second) protocol stack (616), according to some embodiments.

The receiver (e.g., APD) may determine whether or not to perform restoration and/or discrimination on the decoded data. For example, this determination may be based on the level of corruption of the decoded data (e.g., as indicated in 614). Further, the determination may be based on the type of the data (e.g., a semantic block type ID, e.g., as indicated in associated SCI and/or DCI). For example, the determination may use a different threshold level of corruption for different types of data. Further, the determination may be based on what other information may be available (e.g., different thresholds may be used depending on whether or not a small size semantic representation has been received via the first protocol stack). Still further, the determination may be based on available context information, e.g., previously received semantic data. It will be appreciated that all or any combination of these factors may be used as desired.

If the APD determines to perform restoration, the APD may select a restorer and/or a discriminator model. The selection of the model(s) may be based on the same and/or different factors as discussed above for the determination of whether or not to perform restoration. For example, a different subset of the factors may be used. The APD may perform restoration using the restorer model.

If the APD determines to perform discrimination, it may use the discriminator model to determine whether the decoded (and potentially restored) data is received successfully. For example, the discriminator model may indicate whether to send a HARQ positive acknowledgement (ACK)

or negative ACK (NACK) for the transmission. In some cases, the discriminator model may provide further detail to send to the transmitter, e.g., in a semantic NACK. A semantic NACK may provide information to assist the application and/or APD at the transmitter determine the status of the application at the receiver and/or determine what (if any) semantic data should be resent. For example, the semantic NACK may be used to ensure that the transmitter and receiver have consistent context information for the state of the application(s) at both the transmitter and receiver. Similarly, the semantic NACK may indicate a particular portion of semantic data that is requested to be resent.

The receiver (e.g., APD) may provide the decoded (and possibly restored) data to the upper layer (618), according to some embodiments. An SDAP layer of the receiver may further process and/or route the data for the upper layer. In the case that the receiver is the wireless device, the upper layer may be the application layer. In the case that the receiver is the network, the upper layer may be the edge server.

The receiver may transmit response information to the transmitter (620), according to some embodiments. The response information may include HARQ ACK or NACK. The response information may include a semantic NACK, e.g., with additional information as discussed above.

Transmission and Reception Examples

The following examples may describe aspects of particular embodiments of the method of FIG. 6, but it will be appreciated that other embodiments may be used as desired.

The following example may illustrate aspects of the method of FIG. 6, e.g., in context of the receiver side operation for a downlink semantic data transmission (e.g., at a wireless device):

1. PDCCH may be decoded. The location of the SCI may be obtained.
2. PDSCH may be decoded, including the encrypted SCI. SCI may be provided to APD at the receiver for decryption. In some embodiments, based on this, the APD may provide (e.g., to the first protocol stack) the location of a semantic representation (e.g., transmitted via the first protocol stack and PDSCH). Either the APD or the first protocol stack (or both) may receive the semantic representation and decode it.
3. BE-PDSCH may be decoded in best-effort manner.
4. The content of BE-PDSCH. Further, semantic representation may be provided to APD.
5. According to the SCI, the APD may: 1) associate the obtained data with the existing or new semantic processes; 2) select and apply restorer and discriminator models for each semantic data chunk; and/or 3) generate ACK/NACK and/or semantic NACK feedback.
6. Feedback may be provided in the following PUCCH transmission.

The following example may illustrate aspects of the method of FIG. 6, e.g., in context of an uplink semantic data transmission:

1. The wireless device may inform the BS about the wireless device's buffer and semantic data types, e.g., via an SR.
2. BS may schedule the UL transmission. APD (e.g., at the BS/network) may provide SCI to UE in PDSCH and/or PDCCH. Further, the BS may transmit DCI to the wireless device, e.g., indicating the scheduled transmission, e.g., via a grant.
3. Wireless device may decode SCI. The wireless device may transmit data according to the SCI and the scheduling grant.

4. At BS side:
4.1. PUSCH may be decoded. Semantic representation may be obtained based on its known location. The location may be indicated in the SR by the wireless device or in the DCI by the BS.
4.2. BE-PUSCH may be decoded in best-effort manner.
4.3. The content of BE-PUSCH and/or semantic representation may be provided to APD.
4.4. According to the SCI, the APD may: associate the obtained data with the existing or new semantic processes; select and apply restorer and/or discriminator models for each semantic data chunk; and/or generate semantic NACK feedback.

Figure 7:
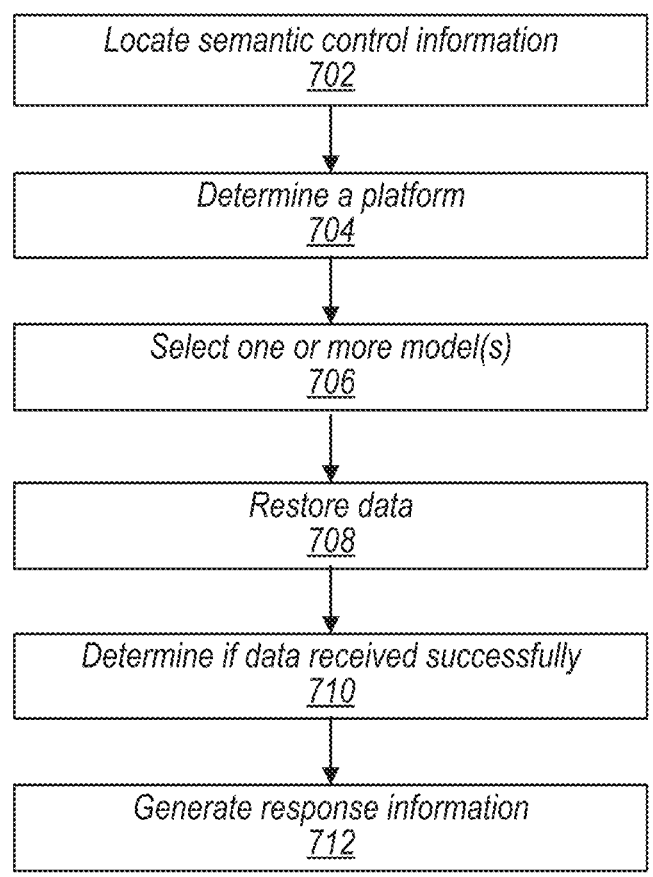

FIG. 7—Further Detail on Receiver Process

To illustrate one set of possible techniques for a data exchange (e.g., as in 512), FIG. 7 is a flowchart diagram illustrating a method for performing reception of semantic data using programmable protocol stack operation, e.g., to support semantic communication, in a wireless communication system, at least according to some embodiments.

Aspects of the method of FIG. 7 may be implemented by a wireless device, e.g., in conjunction with a cellular network including one or more cellular base stations, such as a UE 106, network 100, and BS 102 illustrated in and described with respect to various of the Figures herein, or more generally in conjunction with any of the computer circuitry, systems, devices, elements, or components shown in the above Figures, among others, as desired. For example, a processor (and/or other hardware) of such a device/network may be configured to cause the device/network to perform any combination of the illustrated method elements and/or other method elements.

Note that while at least some elements of the method of FIG. 7 are described in a manner relating to the use of communication techniques and/or features associated with 3GPP and/or NR specification documents, such description is not intended to be limiting to the disclosure, and aspects of the method of FIG. 7 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 7 may operate as follows.

The receiver may locate SCI (e.g., based on DCI, UCI, etc.) (702). The SCI may be in a control channel, a regular data channel (e.g., PDSCH, PUSCH), and/or a BE data channel (e.g., BE-PDSCH/BE-PUSCH). The SCI may be transmitted as part of the semantic data and/or separately.

The receiver may select a platform (e.g., an APD) (704). For example, the receiver may select an APD based on an APD ID (e.g., indicated in DCI, UCI, SCI, header information associated with the data, etc.).

The receiver may determine whether to perform restoration of decoded semantic data and select one or more models (706). The model(s) may be used for restoration and discrimination of the decoded data.

The receiver may restore the data (e.g., using a restoration model) (708).

The receiver may determine whether the data was received successfully (710), e.g., using a discrimination model.

The receiver may generate response information (712). For example, the response information may be or include HARQ response, however HARQ response may be determined differently for the second protocol stack than for the first protocol stack. For example, if the APD of the receiver (e.g., using the selected discriminator model) determines that the semantic data is received sufficiently well for the semantic block type ID (e.g., following restoration and incorporating small size semantic representation, context information, etc.), then the receiver may provide a positive HARQ ACK. Such a positive ACK may be in contrast to a NACK that would be transmitted based on a level of corruption observed at the MAC/PHY level of a received data associated with the first protocol stack. In other words, notwithstanding a level of corruption that would result in a NACK for data of the first protocol stack, an ACK may be transmitted for data of the second protocol stack (e.g., with the same level of corruption at MAC/PHY). Further, the response information may be or include semantic response information (e.g., semantic NACK with additional details). FIGS. 8-20 and Additional Information FIG. 8 illustrates a conceptual view of semantic communication, according to some embodiments. In this example, either the wireless device or the network/BS may be the transmitter. As shown, an application layer may generate an original semantic block (802) and may generate a semantic representation of the semantic block. The semantic representation may be simplified (e.g., reduced size and/or detail) relative to the original.

The application layer may pass (e.g., via transport layer) the original semantic block and the semantic representation to the SDAP. The SDAP may pass the original semantic block to the second protocol stack and the semantic representation to the first protocol stack (804). The ADP may divide the original semantic block into one or more transport blocks, e.g., for BE transmission. The first protocol stack may process the semantic representation for transmission (e.g., using legacy, e.g., lossless transmission). The transmitter may transmit the transport blocks for the original semantic block using a BE channel (e.g., BE-PUSCH, BE-PDSCH) and may transmit the transport block of the semantic representation using a regular data channel (e.g., PUSCH, PDSCH).

The receiver may receive the transmissions of the transport blocks of the original and semantic representation (806). In the example, one or more of the semantic transport blocks of the original may be damaged/corrupted following BE decoding. The semantic representation may be received successfully.

The low layers of the receiver may pass the received data to the APD. The APD may use a restore model to restore the data (807). For example, the restorer model may use the semantic representation to restore the corrupted transport blocks.

The APD may pass the restored transport blocks to the application layer (808). The application layer may combine the restored transport blocks to recreate the original semantic block.

FIG. 9 illustrates an example of communication using the first protocol stack, according to some embodiments. An application platform server or edge server (902) may include an application layer and transport protocol layer. A BS 102 may include SDAP through PHY layers (including a HARQ module, e.g., which may be implemented by the MAC and/or PHY layers). A UE 106 may include the application through PHY layers, including HARQ. Data and/or control information may be exchanged between the PHY layers.

FIG. 10 illustrates how two semantic blocks may be converted to transport blocks, according to some embodiments.

FIG. 11 illustrates an example of communication using the second protocol stack, according to some embodiments. An application platform server or edge server (902) may include an application layer and transport protocol layer. A BS 102 may include SDAP, APD, and MAC and PHY layers (including a HARQ module, e.g., which may be implemented by the MAC and/or PHY layers). A UE 106 may include the application, SDAP, APD, MAC, and PHY, including HARQ. Data and/or control information may be exchanged between the PHY layers.

Figure 12:
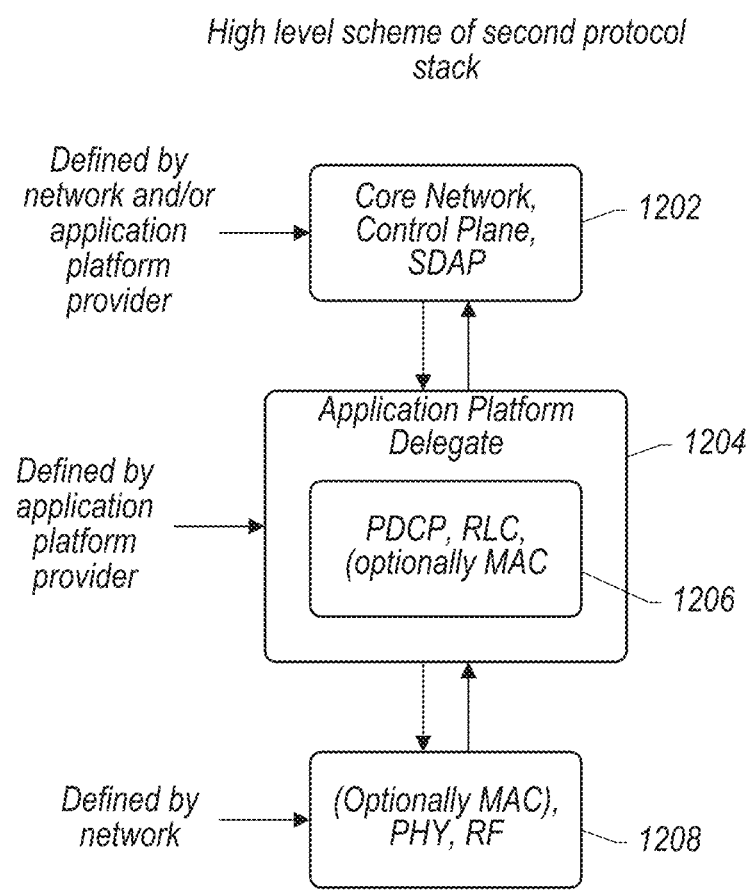

FIG. 12 illustrates a conceptual view of the second protocol stack, according to some embodiments. As shown, upper layers 1202 may be provided by the network and/or application provider. For example, the network may provide core network functions connecting the BS and the edge server (e.g., which may implement an application for the application platform provider). Alternatively, the BS may be in direct communication with a server or other device of the application provider, and thus the application provider may exchange information directly with the BS.

Middle layers 1206 (e.g., PDCP, RLC, and potentially MAC) may be provided by the APD 1204. Thus, these layers may be provided by the application platform provider. It will be appreciated that the APD may not include functions directly similar to these layers (e.g., as these layers may exist in the first protocol stack). Instead, the APD may replace the functions of these layers with functions designed by the application platform provider, e.g., which may or may not be similar to the PDCP and RLC layers of 3GPP.

Lower layers 1208 may be provided by the network, e.g., according to a 3GPP specification.

FIGS. 13 and 14 may illustrate possible protocol stack design approaches, according to some embodiments. An APD (e.g., on the network/BS side) may have a split between centralized unit (CU) and distributed unit (DU) features. This split may be compatible with a similar split, e.g., as may be implemented in the first protocol stack. The protocol between APD CU and DU may be standardized.

FIG. 13 illustrates a first option in which the MAC layer 1306 may be joint for both stacks. In other words, the MAC layer 1306 may operate according to a 3GPP standard (e.g., including various updates) and may work with both the first protocol stack RLC module 1302 and the RLC replacement features of the APD 1204 for the second protocol stack.

FIG. 14 illustrates a second option in which the APD 1204 provides its own functions similar to a 3GPP MAC layer. Thus, the first and second protocol stacks may have individual MACs (1408 and 1412, respectively). Physical resources may be shared between MACs, e.g., in a standardized manner at a joint PHY layer 1414.

In the case of this second option, SCI may not be encrypted (e.g., as the MAC layer is provided by the APD). This may reduce overhead and processing delays. Further, the APD may use knowledge of the application and semantics to perform MAC-type algorithms in an application (or semantic block type) specific manner. Resource sharing (e.g., on the network side) between the APD and the MAC of the first protocol stack may be standardized. The resource sharing may be fair and efficient. In this sense, fairness may mean that an average (over time) share of radio resources provided to MAC may be proportional to the average number (over time) of the associated users (=logical channels) with non-empty RLC buffer. Efficiency may mean that for each user (=logical channel) its marginal key performance indicator (KPI) may be defined. An estimated contribution of a provided RB into its KPI (defined, e.g., at application layer) may be estimated. Increasing the sum over users of marginal KPIs may be a target for efficient resource sharing. Maximizing this target under the constraint of fairness requirement may lead to a generalized proportional fair (PF) strategy. MU MIMO with multiple users sharing the same resources makes the resource sharing more complex.

Figure 15:
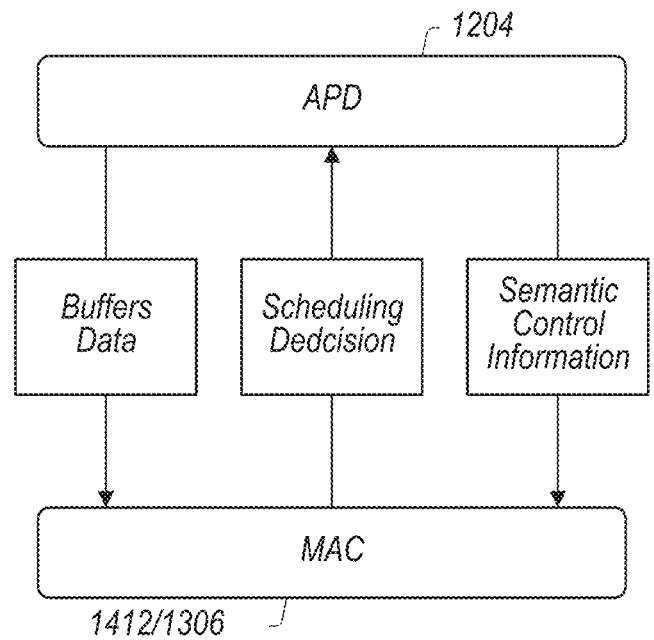

FIG. 15 illustrates interactions between an APD 1204 (e.g., on the transmitter side), according to some embodiments. As shown, the APD may buffer data and indicate the amount of data, type of data, and/or other information to the MAC 1412/1306. The MAC may determine scheduling (e.g., in consultation with MAC 1412, in the case of the second option of FIG. 14) and provide the APD with information about the scheduling (e.g., time and frequency on which the data will be transmitted). The APD may generate SCI (e.g., indicating the time and frequency, e.g., for all or particular parts of the data) and provide the SCI to the MAC. For example, the SCI may include first SCI to be transmitted via the first protocol stack which may indicate the time/frequency location of second SCI to be transmitted via the second protocol stack (e.g., potentially included with the data).

Figure 16:
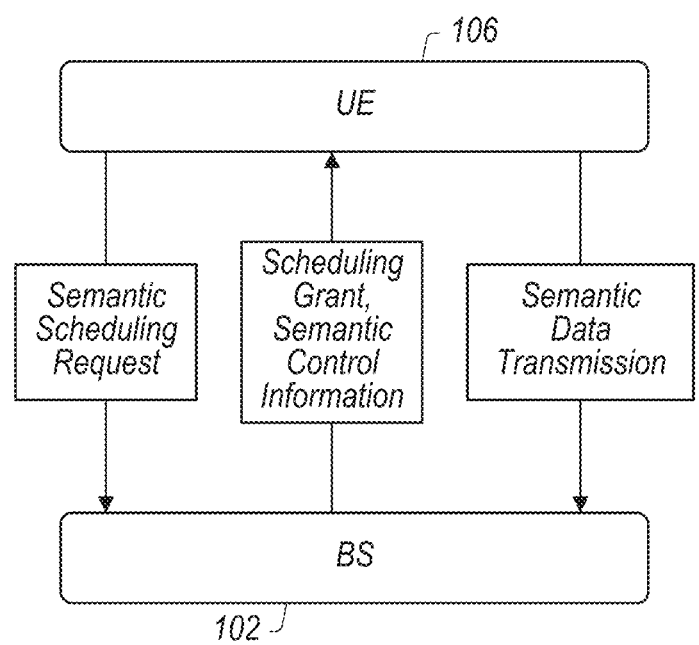

FIG. 16 illustrates scheduling and performing an uplink transmission using the second protocol stack, according to some embodiments. The UE may buffer the uplink data and send an SR. In response to the SR, the BS may provide an uplink grant. The APD of the BS/network may further provide SCI, and the BS may transmit the SCI to the UE. The SCI may be transmitted as part of the SR and/or separately from the SR. The UE may transmit the data according to the SR and/or the SCI.

Figure 17:
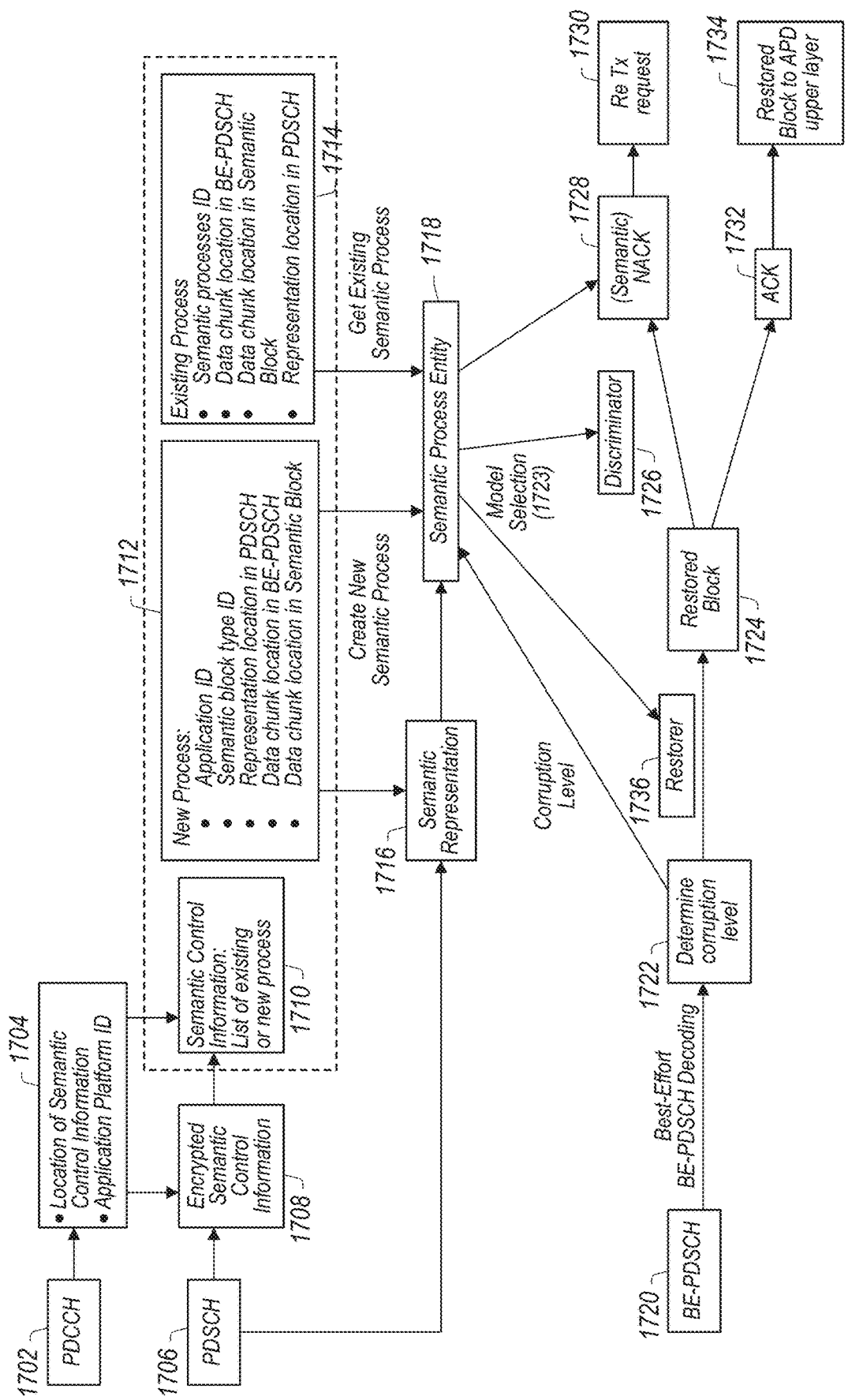

FIG. 17 illustrates an example of a process at a receiver, e.g., in relation to a downlink transmission using the second protocol stack, according to some embodiments. Aspects of the illustrated process may be performed by a MAC layer and/or the APD of the receiver (e.g., UE). The UE (e.g., at a MAC layer) may receive PDCCH (1702) and may determine (1704) (e.g., based on the PDCCH) any or all of a location of SCI and/or an APD ID. The UE may receive PDSCH (1706) and (e.g., at a MAC layer) may retrieve any encrypted SCI from the PDSCH (1708), e.g., if a location is provided in the PDCCH. The MAC layer may provide the encrypted SCI to the APD (e.g., according to the APD ID). The PDSCH may be received using the first protocol stack.

The APD may determine a semantic process based on the SCI (1710). For example, the SCI may indicate one or more semantic processes associated with semantic data, e.g., by indicating one or more of a list of processes. The list of processes may be previously configured, according to some embodiments. In the case that the SCI indicates a new process, details about the new process may be provided in the SCI (1712). For example, any of an application ID, semantic block type ID, a location of a semantic representation in the PDSCH, a location of a data chunk in a BE-PDSCH, and/or a data chunk location in a semantic block (e.g., an indication of how the data in the BE-PDSCH relates to one or more other data chunks (e.g., transmitted together or separately)), may be included, among various possibilities. Further, an ID for the new process may be provided in the SCI. In the case that the SCI indicates an existing process (e.g., using a semantic process ID from the list), details about the data may be provided in the SCI (1714). For example, any of the following may be included, a location of a semantic representation in the PDSCH (note, this may be omitted, e.g., if previously provided), a location of a data chunk in a BE-PDSCH, and/or a data chunk location in a semantic block, among various possibilities.

Based on the location of the semantic representation, the APD may retrieve the semantic representation from the PDSCH (1716). The APD may provide the representation to an (e.g., internal to the APD) semantic process entity (1718).

The UE may receive a BE-PDSCH transmission (1720), e.g., including a transport block of semantic data. The MAC and PHY layers may perform BE decoding and determine a corruption level of the transport block (1722). The MAC layer may provide an indication of the corruption level to the APD and may provide the block to the APD.

Using the information in the SCI and/or the corruption level the, semantic process entity may select one or more models (1723). The APD may perform restoration of the data using a selected restorer model (1736) to generate a restored block (1724). The APD may determine whether the restored block meets a threshold for successful reception using a selected discriminator model (1726). Based on a determination that the block is successfully received, the APD may indicate to the MAC layer to transmit an ACK (1732) and may provide the data to an upper layer of the APD (e.g., in a buffer and/or for further use, 1734). Based on a determination that the block is not successfully received, the APD may indicate to the MAC layer to transmit a NACK (1728). The NACK may be a semantic NACK (e.g., including additional information) or may not be. The MAC layer may transmit the NACK and/or a retransmission request (1730).

Figure 18:
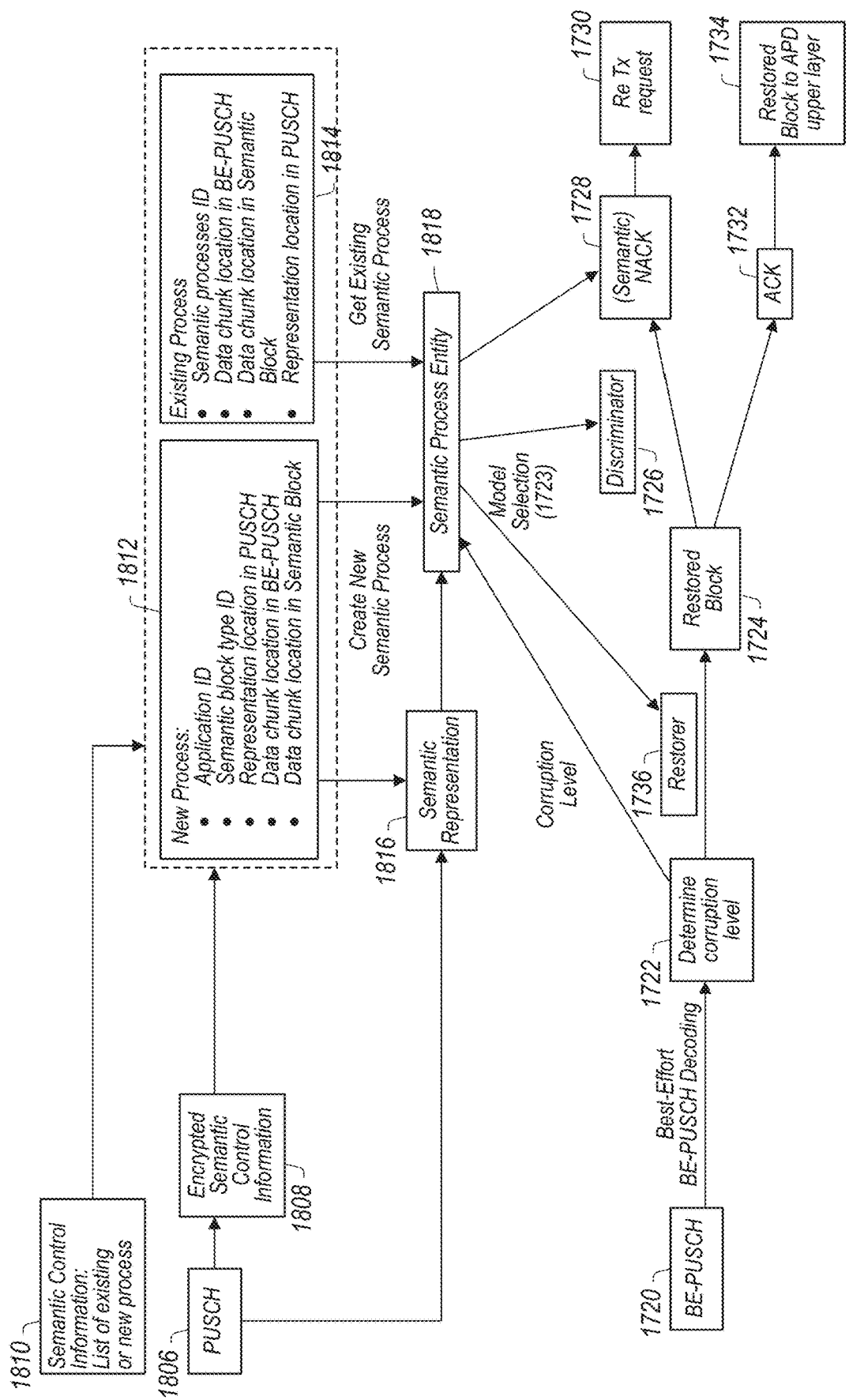

FIG. 18 illustrates an example of a process at a receiver, e.g., in relation to an uplink transmission using the second protocol stack, according to some embodiments. Aspects of the illustrated process may be performed by a MAC layer and/or the APD of the receiver (e.g., BS/network).

The network may receive SCI, e.g., indicating one or more processes from a list of semantic processes (1810). A MAC layer of the network may provide this SCI to the APD, e.g., according to an APD ID associated with the SCI. The SCI may be received from a wireless device and/or an application platform provider (e.g., associated with the APD).

The network may receive PUSCH from the UE (1806), e.g., according to a first protocol stack. The PUSCH may include encrypted SCI (1808). The MAC layer of the network may provide the encrypted SCI to the APD (e.g., according to an APD ID). It will be appreciated that the APD ID and/or location of the encrypted SCI may be provided to the network (e.g., via UCI/PUCCH from the UE and/or via SCI from the application platform).

Using the SCI, the APD may initiate a new process (1812) and provide the SCI and/or provide the SCI to an existing process (1814).

The network may further provide data from the PUSCH to the APD (e.g., based on an APD-ID associated with the data mating the APD). The APD may retrieve a semantic representation from the data (1816) and provide it to the semantic process entity (1818).

The process of receiving BE data (e.g., on PUSCH), restoring the data, and performing acknowledgement may proceed similarly to as described above regarding 1720-1734.

Figure 19:
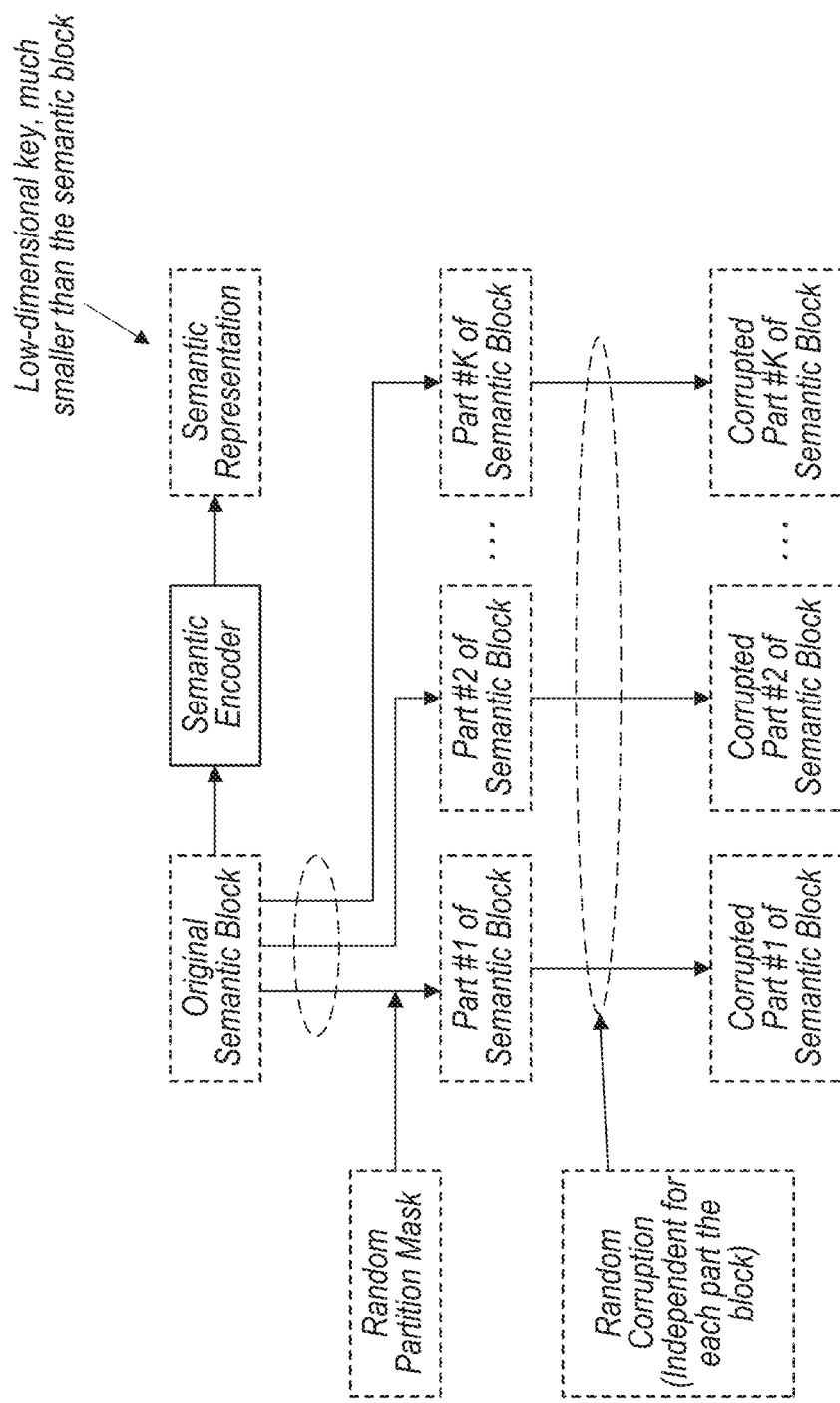
Figure 20:
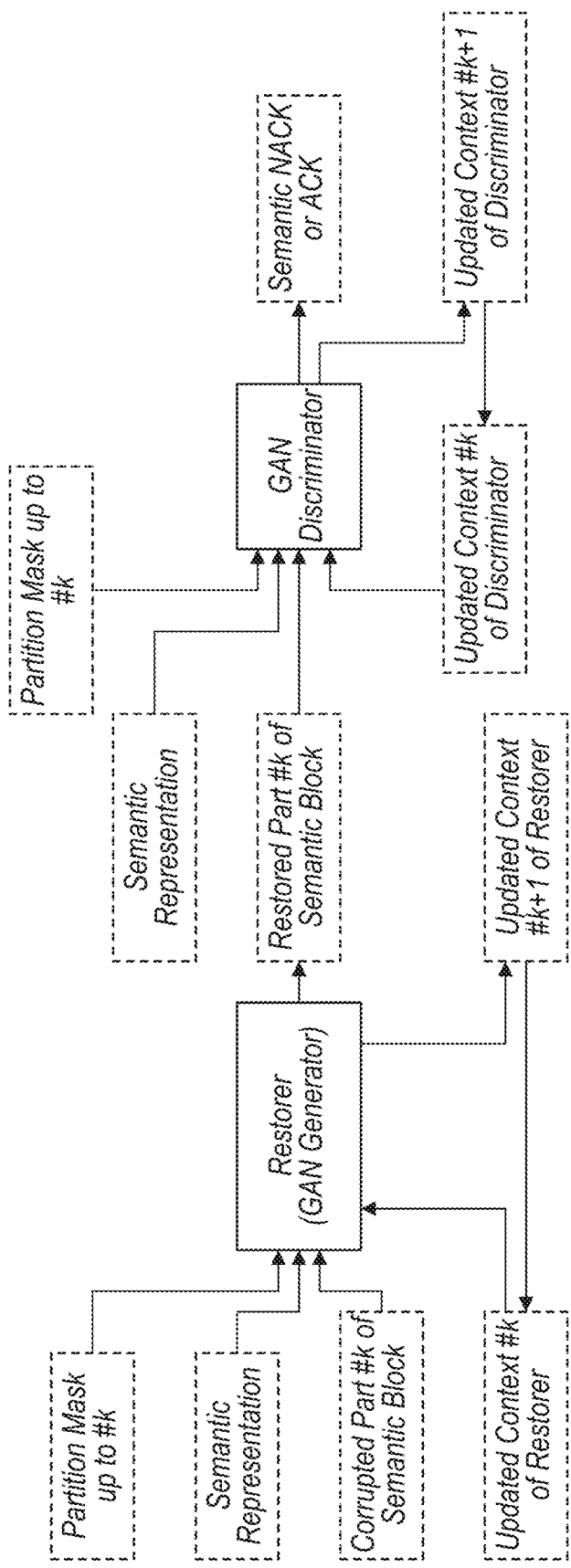

FIGS. 19 and 20 illustrate training a GAN model, e.g., to generate restorer, discriminator, segmenting, and/or semantic encoder (e.g., semantic representation generation) models, according to some embodiments. The models may be trained semi-statically and remotely (e.g., at edge or dedicated server), then shared within parties. For example, the models may be provided by the application platform provider to the network and the UE(s), e.g., for incorporation into/use by the APD. The models may be trained simultaneously. Artificial partitioning and corruption may be used to emulate split into transport blocks and the corruption after best-effort forward error correction. The corruption may be independent for each segment/part of the data. The restorer and discriminator may be RNN-GAN like models. The input and/or output of any or all of the models may include variable dimensions. In some embodiments, segmenting may be performed randomly for training and/or according to one or more segmenting model(s).

In some embodiments, functions of the restorer model and discriminator model may be performed by a single model. For example, a model may both attempt to restore the data and determine whether the data is received successfully (e.g., in view of the restoration).

In some embodiments, one or more models may be jointly trained by a GAN. For example, restorer, discriminator, segmenting, and/or encoding (e.g., semantic representation generation) models may be generated/trained by a GAN. Thus, the training process may result in one or more sets of such models, e.g., so that a set of models may be used together. Different sets of models may be generated for different circumstances (e.g., different types of data, applications, and/or channel conditions, etc.). For example, such models may be trained in advance and/or in a semi-static manner, e.g., by the application platform provider associated with an APD. The models may be provided to the transmitter and receiver, e.g., as part of an APD or separately from an APD. It will be appreciated that not all of the listed models may be trained together or used at all. Similarly, as noted above, the models may be combined.

In the following further exemplary embodiments are provided.

One set of embodiments may include an apparatus, comprising a processor configured to cause a wireless device to: receive, from a cellular network via a control channel, first control information associated with a first block of information for a first application executing on the wireless device; determine, based on the first control information, a first location for receiving the first block of information; receive, from the cellular network via the data channel, the first block of information at the first location; select a first model for interpreting the first block of information from a plurality of models; determine, using at least the first model, whether the first block of information is received successfully; and transmit, to the cellular network, an indication of whether the first block of information is received successfully.

In some embodiments, the processor is further configured to cause the wireless device to: determine, based on the first control information, a second location of second control information associated with the first block of information; receive, from the cellular network via a data channel at the second location, the second control information; and decrypt the second control information, wherein selection of the first model is based at least in part on the second control information.

In some embodiments, the first control information comprises a downlink control information (DCI) message including a field identifying a first application platform delegate associated with the first application, wherein the second control information comprises an encrypted semantic control information message.

In some embodiments, the second control information comprises an indication of a type of the first block of information, wherein the first model is selected based on the type of the first block of information.

In some embodiments, the first model includes a first restorer model associated with the type of the first block of information and respective models of the plurality of models comprise respective restorer models associated with respective types of blocks of information.

In some embodiments, said receiving the first block of information comprises best effort error correction decoding, wherein the processor is further configured to cause the wireless device to: determine that a level of corruption of the first block of information exceeds a first threshold following the best effort error correction decoding; and in response to the determination that the level of corruption of the first block of information exceeds the first threshold, reduce the level of corruption of the first block of information using the first restorer model.

In some embodiments, the processor is further configured to cause the wireless device to: receive a reduced size representation of the first block of information received separately from the first block of information, wherein said reducing the level of corruption of the first block of information using the first restorer model further uses the reduced size representation of the first block of information.

In some embodiments, the first model is a first discriminator model associated with the type of the first block of information and respective models of the plurality of models comprise respective discriminator models associated with respective types of blocks of information.

In some embodiments, said determining, using at least the first discriminator model, whether the first block of information is received successfully is based on the type of the first block of information.

In some embodiments, in response to a determination that the first block of information is not received successfully, the indication of whether the first block of information is received successfully comprises a semantic negative acknowledgement in a format specific to the type of the first block of information.

In some embodiments, the processor is further configured to cause the wireless device to: select a second model from a plurality of second models, wherein: the determination of whether the first block of information is received successfully comprises: using the first model to perform a restoration of the first block of information; and using the second model to determine if the first block of information, after the restoration, meets a threshold for reception; and the first model and the second model are trained together using a generative adversarial network (GAN) model.

In some embodiments, a segmentation model is also trained with the first and second models by the GAN model.

In some embodiments, an encoding (e.g., small sized semantic representation generation) model is also trained with the first and second models by the GAN model.

In some embodiments, the models are trained in advance and/or semi-statically and provided to the transmitter (e.g., encoder and/or small sized semantic representation generation models) and receiver (e.g., restorer and/or discriminator models).

In one set of embodiments, a method may include: at a cellular network: operating a first protocol stack according to a 3GPP wireless standard; operating a second protocol stack, different from the first protocol stack, associated with a first application platform; establishing communication with a first user equipment (UE); establishing communication with a first server associated with the first application platform; receiving, from the first server a first block of information for the first UE; determining, at a first layer, to process the first block of information using a selected protocol stack, wherein the selected protocol stack is one of the first protocol stack or the second protocol stack; processing, below the first layer, the first block of information using the selected protocol stack; and transmitting, using a physical layer, the first block of information to the first UE, subsequent to said processing using the selected protocol stack, wherein the physical layer is used for both the first protocol stack and the second protocol stack.

In some embodiments, the method further includes operating multiple second protocol stacks, wherein respective second protocol stacks of the multiple second protocol stacks are associated with respective application platforms.

In some embodiments, the respective second protocol stacks are associated with respective APD-IDs.

In some embodiments, the first layer is a service data adaptation protocol (SDAP) layer.

In some embodiments, said determining to process the first block of information using the selected protocol stack is based on a service data unit (SDU) packet header of the first block of information.

In some embodiments, said determining to process the first block of information using the selected protocol stack is based on a configuration of a protocol data unit (PDU) session associated with (e.g., including) the first block of information. For example, a PDU session may be configured for a particular protocol stack. Thus, packets of such a PDU session may be directed to the corresponding protocol stack.

In some embodiments, the SDAP layer may add an SDAP header indicating the selected protocol stack.

In some embodiments, the selected protocol stack is the second protocol stack and the first block of information comprises an encrypted header identifying: an application identifier associated with the first block of information; a block type identifier associated with the first block of information; and an identifier of the first block of information useable to determine a relation of the first block of information to at least a second block of information of the application identifier and the block type identifier.

In some embodiments, the selected protocol stack is the second protocol stack and a second layer of the second protocol stack segments the first block of information into a first segment and a second segment according to a type of the first block of information.

In some embodiments, the selected protocol stack is the second protocol stack and the second protocol stack comprises: a second layer implemented by a centralized unit; and a third layer implemented by a distributed unit.

In some embodiments, the second layer is configured to pass, to the first protocol stack, any blocks of information erroneously provided to the second protocol stack.

In some embodiments, the first protocol stack and the second protocol stack share a media access control layer.

In some embodiments, the first protocol stack and the second protocol stack use separate media access control layers.

In one set of embodiments, a method may comprise: at a media access control (MAC) layer of a base station of a cellular network: establishing communication with a first user equipment (UE); receiving, from a higher layer of a first protocol stack operating according to a 3GPP wireless standard, first data for the first UE; receiving, from a higher layer of a second protocol stack, different from the first protocol stack, associated with a first application platform, second data for the first UE; scheduling, for transmission to the UE via a physical layer of the base station, the first data on a first channel, wherein the first channel is a physical downlink shared channel (PDSCH) associated with a first level of losses; scheduling, for transmission to the UE via the physical layer of the base station, the second data on a second channel, wherein the second channel is associated with a second level of losses higher than the first level of losses; scheduling, for transmission to the UE via the physical layer of the base station, first downlink control information (DCI) indicating the scheduling of the first data on the first channel; and scheduling, for transmission to the UE via the physical layer of the base station, second DCI indicating: the scheduling of the second data on the second channel; and an identifier of the first application platform.

In some embodiments, the method further comprises using different policies for modulation and coding scheme (MCS) selection for the second channel relative to the first channel.

In some embodiments, the method may include using different error correcting encoding methods for the second channel relative to the first channel.

In some embodiments, the method further comprises providing, to the higher layer of the second protocol stack, an indication of resources on which the second data is scheduled on the second channel.

In some embodiments, the method further comprises receiving, from the higher layer of the second protocol stack, semantic control information, wherein the second DCI further indicates a location of the semantic control information in a transmission to the UE.

In some embodiments, the method further comprises receiving, from the physical layer of the base station, a scheduling request from the first UE, wherein the scheduling request includes an amount of uplink data associated with a semantic data type of the first application platform.

In one set of embodiments, a method may comprise at a media access control (MAC) layer of a wireless device: receiving, from a physical layer of the wireless device, a first downlink control information (DCI) on a physical downlink control channel (PDCCH); determine, based on the first DCI, a location of first semantic control information (SCI); receive, from the physical layer of the wireless device, the first SCI; provide, to an application platform delegate operating on the wireless device, the first SCI; receive, from the physical layer of the wireless device, first data associated with the first SCI; provide, to the application platform delegate operating on the wireless device, the first data; receive, from the application platform delegate operating on the wireless device, an indication of whether the first data is decoded successfully; and provide, to the physical layer of the wireless device, a hybrid automatic repeat request based the indication of whether the first data is decoded successfully.

In one set of embodiments, a method may comprise at a media access control (MAC) layer of a base station of a cellular network: establishing communication with a first user equipment (UE); receiving, from a higher layer of a first protocol stack operating according to a 3GPP wireless standard, first data for the first UE; receiving, from a layer of a second protocol stack, different from the first protocol stack, associated with a first application platform, an indication that the second protocol stack has second data for the first UE; exchanging one or more coordination message with the layer of the second protocol stack to determine a standardized resource sharing for transmission of the first data and the second data to the UE; and providing, to a physical layer of the base station, the first data for transmission to the according to the standardized resource sharing.

In some embodiments, said exchanging one or more coordination message includes: receiving, from the layer of the second protocol stack, an indication of an amount of data in a buffer of the second protocol stack for the first UE.

In some embodiments, said exchanging one or more coordination message includes: receiving, from the layer of the second protocol stack, an indication of a relative prioritization of the second data for the first UE in comparison to third data, wherein the third data is for the first UE and/or a second UE.

In some embodiments, said exchanging one or more coordination message includes: receiving, from the layer of the second protocol stack, an indication of channel quality information for the first UE.

In some embodiments, said exchanging one or more coordination message includes: providing, to the layer of the second protocol stack, an indication of an amount and/or location of resources allocated to the second protocol stack.

In some embodiments, said exchanging one or more coordination message includes: receiving, from the layer of the second protocol stack, an indication of scheduling of at least a portion of the second data on the resources allocated to the second protocol stack.

In one set of embodiments, a method may comprise at a base station of a cellular network: operating a first protocol stack according to a 3GPP wireless standard; receiving, from an application platform, an application platform delegate (APD); and operating a second protocol stack, different from the first protocol stack, according to the APD, wherein: the APD provides functionality replacing at least: a packet data convergence protocol (PDCP) layer, and a radio link control (RLC) layer; a service data adaptation protocol (SDAP) layer of the first protocol stack provides functionality for the second protocol stack in addition to the first protocol stack; and a physical layer is shared by the first protocol stack and the second protocol stack.

In some embodiments, said receiving the APD is performed prior to operating the first protocol stack.

In some embodiments, the APD comprises: a plurality of restorer models; a plurality of discriminator models; and at least one semantic process entity configured to select a particular restorer model and a particular discriminator model for use in reception of uplink data using the second protocol stack.

In some embodiments, the APD comprises: a plurality of segmentation models; and a plurality of semantic encoding (e.g., representation generation) models, wherein the at least one semantic process entity is configured to select a particular segmentation model and a particular semantic encoding model for use in transmission of downlink data using the second protocol stack.

In some embodiments, said operating the second protocol stack comprises: segmenting first downlink data into semantic blocks according to a semantic block type of the first downlink data.

A further exemplary embodiment may include a method, comprising: performing, by a wireless device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Embodiments of the present disclosure may be realized in any of various forms. For example, in some embodiments, the present subject matter may be realized as a computer-implemented method, a computer-readable memory medium, or a computer system. In other embodiments, the present subject matter may be realized using one or more custom-designed hardware devices such as ASICs. In other embodiments, the present subject matter may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method, comprising:
at a media access control (MAC) layer of a base station of a cellular network:
establishing communication with a first user equipment (UE);
receiving, from a higher layer of a first protocol stack operating according to a 3 GPP wireless standard, first data for the first UE;
receiving, from a layer of a second protocol stack, different from the first protocol stack, associated with a first application platform, an indication that the second protocol stack has second data for the first UE;
exchanging one or more coordination message with the layer of the second protocol stack to determine a standardized resource sharing for transmission of the first data and the second data to the UE; and
providing, to a physical layer of the base station, the first data for transmission to the first UE according to the standardized resource sharing.

2. The method of claim 1, wherein said exchanging one or more coordination message includes:
receiving, from the layer of the second protocol stack, an indication of an amount of data for the first UE that is in a buffer associated with the second protocol stack.

3. The method of claim 1, wherein said exchanging one or more coordination message includes:
receiving, from the layer of the second protocol stack, an indication of a relative prioritization of the second data in comparison to third data.

4. The method of claim 3, wherein the third data is for the first UE.

5. The method of claim 3, wherein the third data is for a second UE.

6. The method of claim 1, wherein said exchanging one or more coordination message includes:
receiving, from the layer of the second protocol stack, an indication of channel quality information for the first UE.

7. The method of claim 1, wherein said exchanging one or more coordination message includes:
providing, to the layer of the second protocol stack, an indication of a resource amount allocated to the second protocol stack.

8. The method of claim 1, wherein said exchanging one or more coordination message includes:
providing, to the layer of the second protocol stack, an indication of a location of resources allocated to the second protocol stack.

9. The method of claim 1, wherein said exchanging one or more coordination message includes:
receiving, from the layer of the second protocol stack, a scheduling indication for at least a portion of the second data on a resource allocated to the second protocol stack.

10. An apparatus, comprising:
a processor configured to cause a media access control (MAC) layer of a wireless device to:
receive, from a physical layer of the wireless device, a first downlink control information (DCI) on a physical downlink control channel (PDCCH);
determine, based on the first DCI, a location of first semantic control information (SCI);
receive, from the physical layer of the wireless device, the first SCI;
provide, to an application platform delegate operating on the wireless device, the first SCI;
receive, from the physical layer of the wireless device, first data associated with the first SCI;
provide, to the application platform delegate operating on the wireless device, the first data;
receive, from the application platform delegate operating on the wireless device, an indication of whether the first data is decoded successfully; and
provide, to the physical layer of the wireless device, a hybrid automatic repeat request response based on the indication of whether the first data is decoded successfully.

11. The apparatus of claim 10, wherein the DCI comprises an identifier of the application platform delegate.

12. The apparatus of claim 11, wherein the processor is further configured to cause the MAC layer of the wireless device to:
select, based on the identifier, the application platform delegate from a plurality of application platform delegates operating on the wireless device.

13. The apparatus of claim 10, wherein the processor is further configured to cause the MAC layer of the wireless device to:
receive, from the application platform delegate, an indication of a location of a semantic representation of the first data, wherein the semantic representation of the first data is distinct from the first data;
receive, from the physical layer of the wireless device, the semantic representation of the first data; and
provide, to the application platform delegate, the semantic representation of the first data.

14. The apparatus of claim 13, wherein:
the first data is received on a best-effort (BE) physical downlink shared channel (PDSCH) (BE-PDSCH); and
the semantic representation is received on a second PDSCH distinct from the BE-PDSSCH.

15. The apparatus of claim 10, wherein the hybrid automatic repeat request response comprises an indication of context of an application associated with the first data.

16. The apparatus of claim 10, wherein the hybrid automatic repeat request response comprises an indication of a portion of the first data requested to be resent.

17. A method, comprising:
at a media access control (MAC) layer of a base station of a cellular network:
establishing communication with a first user equipment (UE);
receiving, from a higher layer of a first protocol stack operating according to a wireless standard, first data for the first UE;
receiving, from a higher layer of a second protocol stack, different from the first protocol stack, associated with a first application platform, second data for the first UE;
scheduling, for transmission to the UE via a physical layer of the base station, the first data on a first channel, wherein the first channel is a physical downlink shared channel (PDSCH) associated with a first level of losses;
scheduling, for transmission to the UE via the physical layer of the base station, the second data on a second channel, wherein the second channel is associated with a second level of losses higher than the first level of losses;
scheduling, for transmission to the UE via the physical layer of the base station, first downlink control information (DCI) indicating the scheduling of the first data on the first channel; and scheduling, for transmission to the UE via the physical layer of the base station, second DCI indicating:
the scheduling of the second data on the second channel; and
an identifier of the first application platform.

18. The method of claim 17, further comprising:
providing, to the higher layer of the second protocol stack, an indication of resources on which the second data is scheduled on the second channel.

19. The method of claim 17, further comprising:
receiving, from the higher layer of the second protocol stack, semantic control information, wherein the second DCI further indicates a location of the semantic control information in a transmission to the UE.

20. The method of claim 17, further comprising:
receiving, from the physical layer of the base station, a scheduling request from the first UE, wherein the scheduling request includes an amount of uplink data associated with a semantic data type of the first application platform.

* * * * *